United States Patent
Cuthbert et al.

(10) Patent No.: US 7,440,875 B2
(45) Date of Patent: Oct. 21, 2008

(54) SCHEMATIC GENERATION

(75) Inventors: Adrian Cuthbert, Impington (GB); Mark Hagger, Fen Drayton (GB); Nigel Bowditch, Cambrridge (GB); Jon Billing, Cambridge (GB); James Andrew Walker, Royston (GB); Kai Luk, Cambridge (GB)

(73) Assignee: M-Spatial Lmited, Cambridge (GB)

( * ) Notice: Subject to any disclaimer, the term of this patent is extended or adjusted under 35 U.S.C. 154(b) by 590 days.

(21) Appl. No.: 10/502,276

(22) PCT Filed: Jan. 23, 2003

(86) PCT No.: PCT/GB03/00297

§ 371 (c)(1),
(2), (4) Date: Jan. 5, 2005

(87) PCT Pub. No.: WO03/062749

PCT Pub. Date: Jul. 31, 2003

(65) Prior Publication Data

US 2005/0107993 A1    May 19, 2005

(51) Int. Cl.
*G06F 17/50* (2006.01)
*G01C 21/32* (2006.01)

(52) U.S. Cl. .......................... 703/2; 701/211
(58) Field of Classification Search ...................... 703/2, 703/5; 713/193; 701/200, 212, 208; 345/594, 345/619, 990

See application file for complete search history.

(56) References Cited

U.S. PATENT DOCUMENTS

| | | |
|---|---|---|
| 4,253,150 A | 2/1981 | Scovill |
| 6,111,539 A | 8/2000 | Mannings et al. |
| 6,169,515 B1 | 1/2001 | Mannings et al. |
| 6,208,934 B1 | 3/2001 | Bechtolsheim et al. |
| 6,212,392 B1 | 4/2001 | Fitch et al. |
| 6,230,099 B1 | 5/2001 | Fabian |
| 6,353,797 B1 | 3/2002 | Heideman |

(Continued)

FOREIGN PATENT DOCUMENTS

DE    10030805    1/2002

(Continued)

OTHER PUBLICATIONS

Autodesk MapGuide Autodesk announces Autodesk Mapguide 6 for fast, easy distribution of mapping, GIS, and Design Data to thousands of users simultaneously. www.usa.autodesk.com.

(Continued)

*Primary Examiner*—Thai Phan
(74) *Attorney, Agent, or Firm*—Pearl Cohen Zedek Latzer, LLP

(57) ABSTRACT

A method of generating data representative of a geographical network (such as a road network) is disclosed, comprising steps of selecting from a database (2) data relating to an extended junction (formed from at least one node at least one edge) and outputting the selected data. The method address problems in existing devices relating to the selection of appropriate data, and finds particular application in the field of mobile devices and the like. Apparatus for generating data representative of a geographical network and a method of providing a graphical schematic of a location are also disclosed.

48 Claims, 15 Drawing Sheets

U.S. PATENT DOCUMENTS

| | | | |
|---|---|---|---|
| 6,381,535 | B1 | 4/2002 | Durocher et al. |
| 6,424,933 | B1 | 7/2002 | Agrawala et al. |
| 2001/0034588 | A1 | 10/2001 | Agrawals et al. |
| 2001/0041561 | A1 | 11/2001 | Ventulett et al. |
| 2002/0004382 | A1 | 1/2002 | Cox et al. |
| 2002/0107029 | A1 | 8/2002 | Caughran et al. |
| 2003/0221118 | A1 * | 11/2003 | Walker ............... 713/193 |

FOREIGN PATENT DOCUMENTS

| | | |
|---|---|---|
| EP | 0091268 | 10/1983 |
| EP | 0129439 | 12/1984 |
| EP | 0810571 | 12/1997 |
| EP | 1118837 | 7/2001 |
| GB | 2258062 | 1/1993 |
| GB | 2275120 | 8/1994 |
| GB | 2360588 | 9/2001 |
| JP | 2001004393 | 1/2001 |
| JP | 2001004394 | 12/2001 |
| WO | WO 96/07267 | 3/1996 |
| WO | WO 98/45823 | 10/1998 |
| WO | WO 99/56082 | 11/1999 |
| WO | WO 00/04730 | 1/2000 |
| WO | WO 00/27143 | 5/2000 |
| WO | WO 00/51267 | 8/2000 |
| WO | WO 01/26393 | 4/2001 |
| WO | WO 01/27812 | 4/2001 |
| WO | WO 01/33825 | 5/2001 |
| WO | WO 01/71484 | 9/2001 |
| WO | WO 01/71485 | 9/2001 |
| WO | WO 01/92827 | 12/2001 |
| WO | WO 01/93476 | 12/2001 |

OTHER PUBLICATIONS

Autodesk MapGuide Features www.usa.autodesk.com.
Map24 About Map24 www.map24.co.uk.
Net Solut—online systems History www.netsolut.de.
RAC Route Planner Plan routes for the UK and Europe www.rp.rec.co.uk.

* cited by examiner

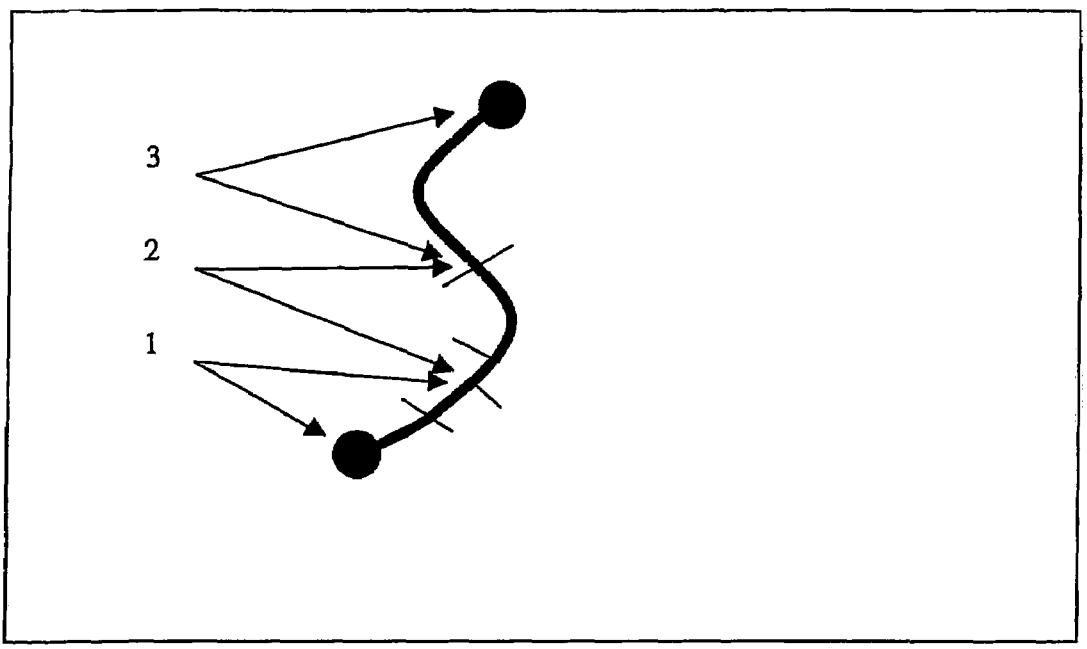
*Fig. 6*
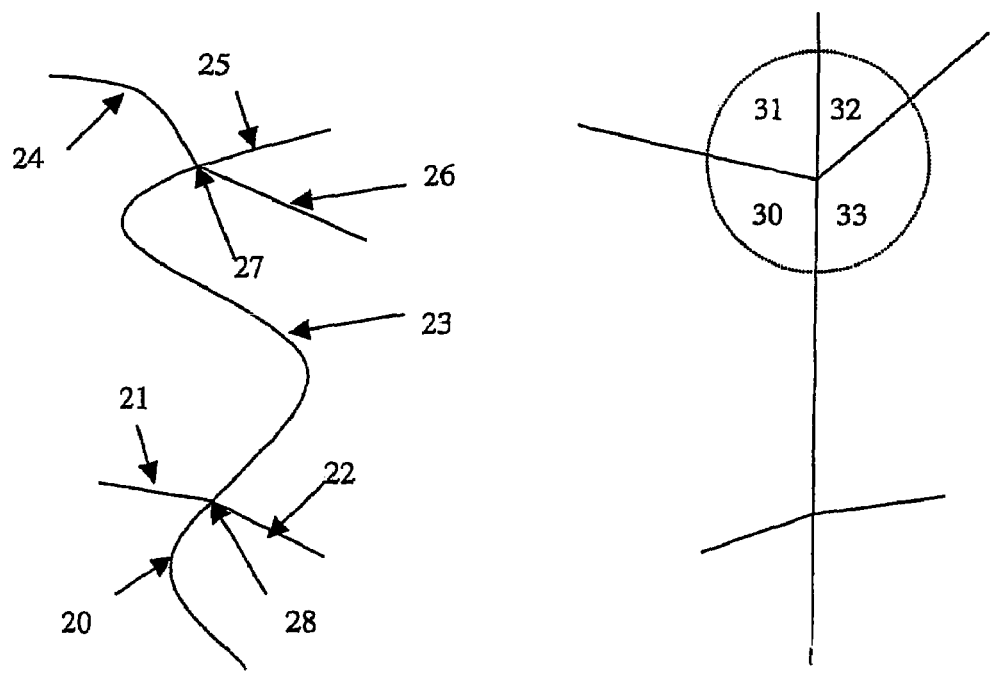
*Fig. 7*          *Fig. 8*

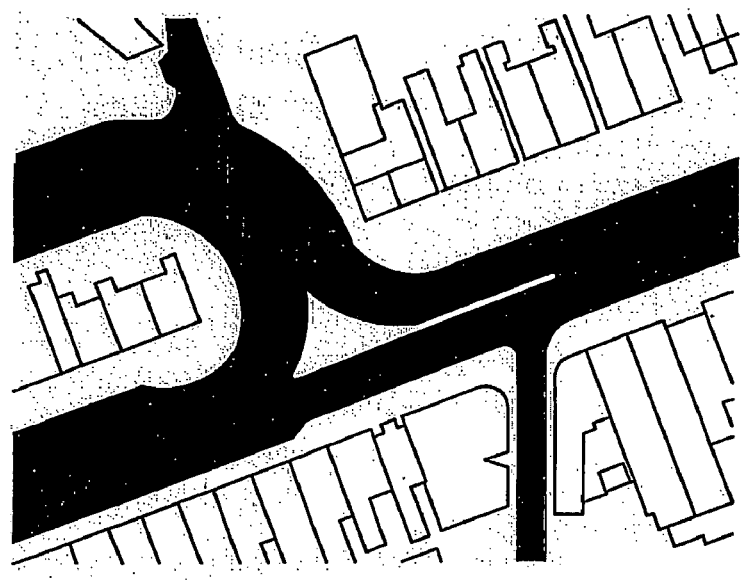
*Fig. 15*
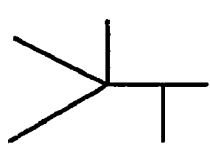 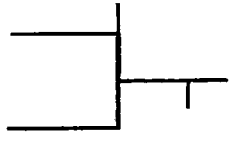 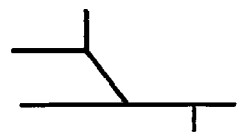
*Fig. 16A*  *Fig. 16B*  *Fig. 16C*
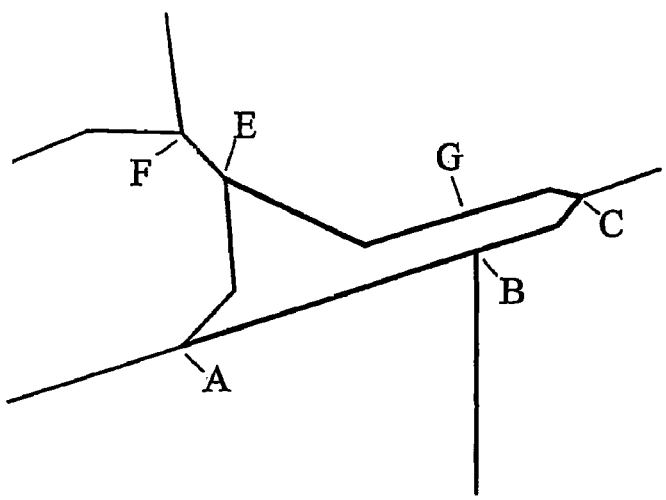
*Fig. 17*

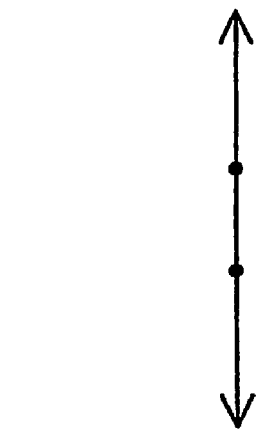
Fig. 23C
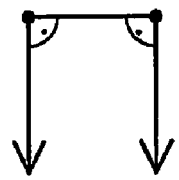
Fig. 24C
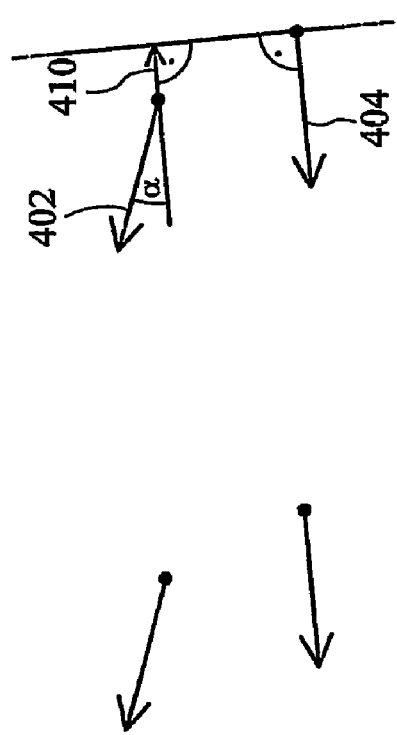
Fig. 23B
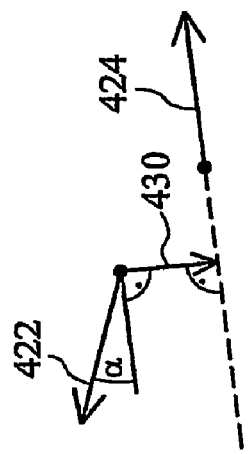
Fig. 24B
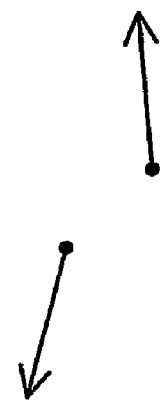
Fig. 23A
Fig. 24A

SCHEMATIC GENERATION

PRIOR APPLICATION DATA

The present application is a national phase application of International Application PCT/GB03/00297, entitled "SCHEMATIC GENERATION" filed on Jan. 23, 2003, which in turn claims priority from United Kingdom application 0201517.0, filed on Jan. 23, 2002, and United Kingdom application 0227466.0, filed on Nov. 25, 2002, and United Kingdom application 0227466.8, filed on Nov. 25, 2002, all of which being incorporated by reference in their entirety.

FIELD OF THE INVENTION

The invention relates to a method of and apparatus for generating data representative of a geographical network and a method of providing a graphical schematic of a location. The invention finds particular application in the field of routing services for mobile devices.

BACKGROUND OF THE INVENTION

Conventional World-Wide Web based routing and guidance services provide information geared to large-screen devices such as computer terminals, but are generally unsuitable for use with small devices such as mobile phones and PDAs.

Mobile devices usually have small screens with limited capacity for representing complex geographical information such as maps.

SUMMARY OF THE INVENTION

The invention seeks to address some problems associated with known systems.

Accordingly, a first aspect of the invention provides a method of generating data representative of a geographical network, using a database containing data representative of nodes and edges connected to such nodes, the nodes and edges being representative of the geographical network, and the method comprising the steps of (a) selecting data from the database relating to an extended junction, which junction comprises at least one node an at least one edge, and (b) outputting the selected data.

The terms 'node' and 'edge' as used herein are preferably used in the topological sense, such that, for example, a node may define a point in a network, and an edge may define an interconnection between any two such points. Such an edge may be constrained to a straight line, or may define a more complicated interconnection. In the context of a road network, a 'simple' road junction (where two or more roads meet at a point) could be considered a 'node' a nd the roads themselves could be considered 'edges'.

The term 'extended junction' as used herein preferably connotes a combination of node(s) and edge(s) that together can be considered to form a single 'higher-level' node and related edge(s). For example, in the context of a road traffic junction, the many road junctions surrounding a roundabout may be considered as forming a single extended junction (node) with all of the roads feeding into the roundabout as edges connected to it. By contrast, a 'simple junction' preferably connotes an indivisible entity in the network (such as a T-junction in a road network) comprising a single node and connected edges.

By selecting an extended junction, and selecting and outputting data relating to it, the data representative of a geographical network can be generated more efficiently, for example since sufficient information relating to a junction can be provided without the need necessarily to select and output all of the data in the database.

The database is preferably a database of geographical data, for example containing coordinates and interconnection information defining a road network (or alternatively a rail or footpath network, and so on). The database may contain, for example, tables containing node and edge data respectively, and a further table defining the interrelationship between the two.

Preferably the step of selecting data comprises (i) selecting from the database a node which forms part of the extended junction, and (ii) selecting from the database in accordance with predetermined criteria at least one edge which forms part of the extended junction and which is connected to the selected node.

This can further reduce the amount of data which needs to be selected for a particular representation.

The step of selecting data may comprise selecting an edge if the length of the edge is less than a predetermined length. Alternatively or additionally, the step of selecting data may comprise selecting an edge in accordance with a related flag in the database (for example, a flag indicating whether or not the edge is to be considered as significant).

Also, the step of selecting data may comprise selecting an edge in accordance with data in the database which relates the edge with another edge that has already been selected.

The step of selecting data may even comprise selecting an edge if the edge is an element of a road artefact such as a roundabout, dual carriageway or traffic island. The step of selecting data may further comprise analysing the network adjacent to an edge to determine whether the edge is an element of a road artefact.

The step of selecting data preferably further comprises the step of selecting at least one node connected to any of the selected edges. This can again improve the efficiency of the selection of data by ensure that further selected data (such as the above-mentioned node connected to any of the selected edges) has a clear relation to the initially selected node.

Alternatively or additionally, the step of selecting data may further comprise the step of selecting at least one edge connected to but not forming part of the extended junction. This can allow a context to be generated for the extended junction without necessarily requiring the entire data set to be selected.

Preferably the step of outputting the selected data comprises transmitting the selected data to a client device, such as a mobile device (for example a mobile phone or PDA). By transmitting the selected data to the device, rather than for example selecting the data in the device itself, the memory and speed requirements of the client device can be minimised.

Preferably the method further comprises the step of displaying the selected data on a handheld device, preferably in the form of a graphical schematic. Thus, any screen size (and cost) may be kept to a minimum. Alternatively, text may be used either to render a simple schematic, or to provide a descriptive summary of the data, with a potential benefit in terms of the reduced amount of data which may need to be output. A graphical schematic may be generated from the data in accordance with one or more of the device's screen size, aspect ratio, colour capabilities and other attributes of the device. The data may be selected and/or displayed in a way suitable for use by a pedestrian. Alternatively or in additionally, data and/or graphical schematics may be selected, modified or generated in accordance with user preferences. This has the advantage that the routing information received by a user may be customised.

Preferably the method further comprises selecting further data relating to a further extended junction by selecting a further node in the database, and identifying one or more further edges connected to the selected node and meeting the same or further predetermined criteria, and further outputting the further data relating to the further extended junction. This can usefully extend the range of the data whilst avoiding a potentially wasteful generation of data less relevant to the initially selected node.

In a further aspect of the invention there is provided a method of processing data representative of a geographical network, which network is formed from nodes connected by edges, the method comprising selecting an edge, analysing the portion of the network adjacent to the selected edge to determine whether the edge is an element of an artefact; and processing the selected edge in dependence on the result of the analysis.

The term 'artefact' as used herein preferably connotes a network component which comprises at least one node and at least one edge and whose presence is incidental to the overall structure and/or purpose of the network, and moreover may be the cause of additional complications to the network. For example, in the context of a road network, a traffic island can be considered an 'artefact', since it is not required for the purpose of efficient navigation from one location to another, and creates additional road junctions (nodes) and connecting roads (edges) in its vicinity.

By such analysis and processing to take into account artefacts in the network processing time and data size can be prioritised accordingly.

The step of analysis preferably comprises determining whether the configuration of the portion of the network adjacent to the selected edge satisfies predetermined criteria. Where the network is a road network, for example (other otherwise), the step of analysing the network may comprise determining whether the edge forms part of a traffic island.

Preferably the method further comprises processing the set of selected nodes and edges in accordance with a modification algorithm, thereby allowing the data to be further optimised for any particular application. Such a modification algorithm may be written in an interpreted or a compiled language (such as PL/SQL, C++ or Java, for example). The method may further comprise modifying a graphical schematic produced from the data in accordance with a predetermined modification algorithm.

In a related aspect of the invention, there is provided a method of processing data representative of a geographical network, the method comprising the steps of (a) retrieving the data from a database, (b) processing the data in accordance with a modification algorithm, and (c) outputting the processed data.

Preferably the modification algorithm geometrically simplifies the data, potentially reducing data sizes.

Where the data includes a plurality of nodes, the modification algorithm may adjust the relative positions of the nodes. Where the data includes a plurality of edges, the modification algorithm may adjust the relative angles between at least twos such edges. The modification algorithm may snap the relative angles of at least two edges to one of a set of preferred angles, and the algorithm may adjust the relative angles of at least two edges to be parallel or anti-parallel.

Furthermore, the modification algorithm preferably includes the steps of (a) identifying preferable alignment relationships between different elements of the data, and (b) adjusting the relative positions of the elements so as to provide an arrangement which best satisfies the identified alignment relationships.

Where the data includes at least one node and at least one edge connected to the node(s) and being representative of at least one junction exit, the modification algorithm may include the steps of identifying at least one edge as a junction exit, identifying preferable alignment relationships between the or each junction exit, and adjusting the relative positions and/or angles of the junction exits so as to provide an arrangement which best satisfies the identified alignment relationships.

The method may further comprise computing a measure of the strength of the alignment relationships in dependence on the similarity of the geometry of the elements to a predetermined relationship, such as a parallel or anti-parallel relationship.

Where the data includes at least one node and at least one edge connected to the node(s), the modification algorithm may preserve anti-parallel relationships between pairs of edges in preference to parallel relationships between pairs of edges, and/or the modification algorithm may include the steps of identifying one or more of said edges as junction exits, and grouping the junction exits into clumps of junction exits which can be displayed as emanating from the same point.

Also, the modification algorithm may attempt to minimise the numbers of clumps.

Additionally, where the data includes at least one node and at least one edge connected to the node(s), the modification algorithm may include the steps of (a) identifying one or more of said edges as junction exits, (b) determining the angle of each of the junction exit(s), and (c) modifying the data in accordance with the angle(s) of the junction exit(s). The junction exit is preferably defined by a series of polyline segments at different angles, and the angle of the junction exit is preferably determined by analysing the polyline segments to determine a representative angle.

Preferably, outputting the selected or processed data comprises outputting the data as graphical data, preferably in the form of a graphical schematic.

The modification algorithm preferably aligns the graphical data with a selected screen geometry.

The modification algorithm preferably further comprises the steps of: receiving route data defining a route as a set of nodes; computing a measure of the significance of one such node; and processing the route data in accordance with the computed significance.

This feature is provided independently, therefore a further aspect of the present invention preferably provides a method of processing data representative of a geographical network, comprising the steps of: receiving route data defining a route as a set of nodes; computing a measure of the significance of one such node; and processing the route data in accordance with the computed significance.

Computing a measure of the significance of a node preferably comprises classifying the node as one of significant and insignificant; computing a measure of the significance of a node preferably comprises retrieving a first parameter associated with a first edge connected to the node and a second parameter associated with a second edge connected to the node; and comparing the first and second parameters.

The first parameter preferably comprises a classification associated with the first edge and the second parameter preferably comprises a classification associated with the second edge. The first parameter may comprise a road name associated with the first edge and the second parameter may comprise a road name associated with the second edge.

Processing data representative of a geographical network preferably further comprises segmenting the route into a plurality of route segments in accordance with said computed significance.

Processing the data preferably comprises computing a measure of the significance of each of a plurality of such nodes and segmenting the route into a plurality of route segments in accordance with said computed significances.

Processing the data preferably comprises segmenting the route into a plurality of route segments, wherein segmenting the route comprises generating a route segment bounded by two significant nodes, the route preferably having a start node and an end node, and wherein segmenting the route comprises generating a plurality of route segments each bounded by two significant nodes or by one significant node and one of the start and end nodes.

Processing the data preferably comprises segmenting the route into a plurality of route segments, further comprising further segmenting one of the plurality of route segments if the segment exceeds a pre-determined length or if the segment comprises more than a pre-determined number of insignificant nodes.

In a further aspect the invention provides a method of providing a graphical schematic of a location, the method comprising the steps of: (a) selecting one or more of points of interest from a database in accordance with a predetermined selection algorithm, (b) generating a graphical schematic including the selected points of interest, and (c) outputting the graphical schematic generated in step b).

The selection algorithm can enable a relatively 'uncluttered' schematic to be generated, in which only relevant points of interest (herein referred to as POIs) are provided, and other redundant information is omitted.

Preferably the algorithm includes the steps of ranking a plurality of points of interest, and selecting one or more of the points of interest in accordance with their rank. Thus for example the algorithm may select only a predetermined number of points of interest, for instance the ten highest ranked points of interest.

Preferably the algorithm includes the steps of retrieving one or more stored parameters associated with each point of interest, and selecting one or more of the points of interest in accordance with their associated stored parameter(s). Thus for instance the parameter may indicate the category of the POI (for instance the POI may be categorised as a 'Cinema' or a 'House'). In this case the algorithm may only select POIs within a certain category, or may preferentially select POIs within that category.

Preferably the selection algorithm comprises the steps of selecting a location; and selecting one or more points of interest within a predetermined radius of the selected location. Thus the algorithm can limit the field of selection.

In one example the database includes a plurality of nodes and the selection algorithm includes the steps of selecting a node, defining a region surrounding the node, and selecting points of interest within the defined region. Thus the node may represent, for instance, a junction in a road map.

The region may have a complex shape, or the method may, for example, comprise defining a circular region centered on the node.

The selection algorithm may select one or more of points of interest from the database in accordance with the visibility of the points of interest, or in accordance with the time of day.

The method may further comprise storing a list of favorite points of interest associated with a particular user, the selection algorithm then preferentially selecting points of interest stored in the list.

The selection algorithm may select one or more of points of interest from the database in accordance with user preferences or advertising requirements. This allows further personalisation of the routing information received by a user.

The method may further comprise the steps of (a) calculating a direction, and (b) outputting data which indicates the direction calculated in step a). In contrast with a conventional 'map', which may include an arrow indicating the direction north, this aspect of the invention enables any resulting graphic schematic to be 'customised' by indicating any desired direction—for instance to indicate the direction in which a user should move in order to proceed to a desired destination.

This important feature is also provided independently. Accordingly, in a related aspect of the invention there is provided a method of providing a graphical schematic of a location, the method comprising the steps of (a) calculating a direction, (b) generating a graphic schematic including information which indicates the direction calculated in step a), and (c) outputting the graphical route schematic.

The information may be presented in a variety of ways. For example the schematic may be coloured red in the desired direction, and blue away from the desired direction, with gradations of colouring in-between. Preferably the information is provided in the form of a marker such as an arrow.

Typically the graphical schematic includes a junction including a incoming road segment taken into the junction and a outgoing road segment taken out of the junction, and the method includes the step of determining the angle between the incoming and outgoing road segments and selecting the information in step b) in accordance with the angle. For instance the number of arrows included in the graphical schematic may vary in accordance with the angle.

The method may further comprise the steps of determining the current position of the moon or sun, and outputting data which indicates the current position of the moon or sun as determined in the previous step.

This aspect can enable a user of the data to orient themselves more easily by noting the current position of the moon or sun, and correlating this with the information provided in any resulting schematic.

In a further aspect the invention provides a method of providing a graphical schematic of a location, the method comprising the steps of: (a) determining the current position of the moon or sun, (b) generating a graphical schematic of the location, the schematic including information which indicates the current position of the moon or sun determined in step a), and (c) outputting the schematic generated in step b).

The information may be provided in a variety of ways. For instance the schematic may be coloured more brightly in the direction of the moon or sun. Alternatively the information may comprise a marker. In one example the position of the marker within the schematic is dependent on the current position of the moon or sun. In another example the marker may comprise a shadow image, the configuration of the shadow image being dependent on the current position of the moon or sun.

The method may further comprise the steps of (a) receiving configuration data, and (b) generating the graphical schematic in accordance with the configuration data received in step a). This can enable a graphic schematic to be 'customised' in any desired manner, for instance to adapt to different device properties (such as screen size or resolution) or user preferences.

In a further aspect the invention provides a method of providing graphical schematic data, the method comprising the steps of (a) receiving configuration data, (b) generating a graphical schematic in accordance with the configuration data received in step a), and (c) outputting the graphical schematic generated in step b).

The method may further comprise (a) selecting a network element from a database, (b) selecting a point of interest from a database in accordance with a predetermined selection algorithm, (c) determining a geometrical relationship between the network element selected in step a) and the point of interest selected in step b), (d) generating an abstract representation of the point of interest in accordance with the geometrical relationship determined in step c), (e) generating a graphical schematic including the set of network elements selected in step a) and the abstract representation of the point of interest generated in step d), (f) outputting the graphical schematic.

In a further aspect the invention provides a method of providing a graphical schematic of a location, the method comprising the steps of (a) selecting a network element from a database, (b) selecting a point of interest from a database in accordance with a predetermined selection algorithm, (c) determining a geometrical relationship between the network element selected in step a) and the point of interest selected in step b), (d) generating an abstract representation of the point of interest in accordance with the geometrical relationship determined in step c), (e) generating a graphical schematic including the set of network elements selected in step a) and the abstract representation of the point of interest generated in step d), and (f) outputting the graphical schematic.

This aspect generates an abstract representation of a point of interest (POI) based on the geometrical relationship of the POI with a network element (such as an edge or node). This enables the network element to be manipulated (for instance translated or rotated) whilst maintaining a consistent display of the POI relative to the network element. The geometrical relationship is generally some relative relationship such as apparent size, visibility or closeness. Other non-relative properties of the POI (such as actual size, shape etc) can be disregarded.

In particular, the geometrical relationship may relate to the visibility of the point of interest from the edge, to the apparent size of the point of interest from the edge, or to the distance of the point of interest from the edge. The abstract representation of the point of interest may comprise an abstract frontage of the point of interest, directed towards the edge.

In a further aspect the invention provides a method of providing a graphical schematic of a location bounded by a defined geographical area, the method comprising the steps of (a) selecting one or more of points of interest falling outside the defined geographical area from the database, (b generating a graphical schematic of the defined geographical area, the graphical schematic including an indication of the direction of the point(s) of interest falling outside the defined geographical area; and (c) outputting the graphical schematic generated in step b).

This aspect of the invention enables further information to be provided—for instance if the defined geographical area contains no POIs, or if the selected POI(s) are of particular importance—for instance the direction of a highly visible landmark (such as the Eiffel Tower in Paris) may be indicated, despite the fact that it lies outside the area.

The graphical schematic may include first source data from a first source and second source data from a second source.

In a further aspect the invention provides a method of providing a graphical schematic, the method comprising the steps of obtaining first source data from a first data source, obtaining second source data from a second data source, generating a graphical schematic including said first source data and said second source data, and outputting said graphical schematic.

This aspect can 'merge' or 'conflate' data from different sources in order to generate the schematic.

Preferably the method includes the steps of identifying a first feature in the first data source, identifying a second feature in the second data source, determining whether the second feature overlaps with the first feature, and associating the second feature with the first feature if the second feature overlaps with the first feature. This can enable the data from the two source to be merged smoothly. Thus for example the first feature may be a building, and the second feature may be a name associated with that building.

In one example the method further comprises identifying a second set of extended junction elements by selecting a node from the data source, and identifying one or more internal edges which connect with the selected node and meet predetermined criteria; wherein the output graphical schematic output includes a first extended junction comprising the first set of extended junction elements, and a second extended junction comprising the first set of extended junction elements.

The first and second extended junctions may be joined for example by a continuous or broken line.

A further aspect of the invention provides a method of processing graphical data, the method comprising selecting an edge which forms part of a network of nodes connected by edges; analysing the network adjacent to the selected edge to determine whether the edge is an element of a road artefact; and processing the selected edge in accordance with the analysis.

This method enables a certain type of road artefact (such as a traffic island, roundabout or dual carriageway) to be identified and processed accordingly. Previously this has only been possible by labelling the artefact in the source data.

A further aspect of the invention provides a method of providing a graphical schematic of a location, the method comprising the steps of:
  a) retrieving graphical data from a database;
  b) generating a schematic by modifying the graphical data in accordance with a predetermined modification algorithm; and
  c) outputting the schematic generated in step b).

This aspect enables a schematic to be customised for instance by aligning the graphical data with a selected screen geometry. Alternatively the schematic may be simplified for instance by straightening lines. Alternatively the 'look and feel' of the schematic may be customised, for instance by shading areas according to crime statistics.

The modification algorithm may simplify the graphical data for example by adjusting the relative positions of nodes or relative angles of edges in the graphical data.

An advantage of this aspect is that a variety of different schematics can be generated from a common set of source data. Also, the format and/or content of the schematics can be customised for a particular user or output device.

Typically the modification algorithm includes the steps of identifying one or more edges as junction exits; identifying alignment relationships between the junction exits; and adjusting the relative positions and/or angles of the junction exits so as to provide an arrangement which best satisfies the identified alignment relationships. Thus for example the algorithm may preserve particularly strong relationships, such as anti-parallel or parallel alignment relationships.

The modification algorithm may also include the steps of identifying one or more edges as junction exits; and grouping the junction exits into clumps of junction exits which can be displayed as emanating from the same point. The numbers of clumps can then be minimised so as to simplify the schematic.

The modification algorithm may align the graphical data with a selected screen geometry.

The modification algorithm may include the step wherein the data or schematic is generated by, processed by and/or out put from a central server; the algorithm including receiving and displaying the data or schematic at a mobile client device.

There is preferably provided a system for performing the modification algorithm which comprises a central server configured to generate and output schematics to a mobile client device; and a mobile client device configured to receive and display the schematics.

A further aspect of the invention preferably provides a mobile client device adapted to receive or display data or a schematic generated by a modification algorithm as described above.

In a further aspect of the invention there is provided apparatus for generating data representative of a geographical network, using a database containing data representative of nodes and edges connected to such nodes, the nodes and edges being representative of the geographical network, and the apparatus comprising (a) means (such as a processor and associated memory) for selecting data from the database relating to an extended junction, which junction comprises at least one node and at least one edge, and (b) means (such as an output) for outputting the selected data.

The apparatus for processing data representative of a geographical network preferably comprises means (for example in the form of a processor with associated memory) for selecting data, comprising: (i) means (for example in the form of a processor with associated memory) for selecting from the database a node which forms part of the extended junction; and (ii) means (for example in the form of a processor with associated memory) for selecting from the database in accordance with predetermined criteria at least one edge which forms part of the extended Junction and which is connected to the selected node.

The means for selecting data preferably comprises means (for example in the form of a processor with associated memory) for selecting an edge if the length of the edge is less than a predetermined length and means (for example in the form of a processor with associated memory) for selecting an edge in accordance with a related flag in the database.

The means for selecting data preferably comprises means (for example in the form of a processor with associated memory) for selecting an edge in accordance with data in the database which relates the edge with another edge that has already been selected.

The means for selecting data preferably comprises means (for example in the form of a processor with associated memory) for selecting an edge if the edge is an element of a road artefact such as a roundabout, dual carriageway or traffic island. It preferably further comprises means (for example the form of a processor with associated memory) for analysing the network adjacent to an edge to determine whether the edge is an element of a road artefact.

The apparatus for processing data representative of a geographical network preferably comprises means (for example in the form of a processor with associated memory) for selecting at least one node connected to any of the selected edges and means (for example in the form of a processor with associated memory) for selecting at least one edge connected to but not forming part of the extended junction.

The apparatus for processing data representative of a geographical network preferably comprises means (for example in the form of a processor with associated memory) for outputting the selected data comprising means (for example in the form of a wired or wireless network connection) for transmitting the selected data to a client device and means (for example in the form of a processor with associated memory) for displaying the selected data on a handheld device, preferably in the form of a schematic.

The means for selecting data preferably further comprises means (for example in the form of a processor with associated memory) for selecting further data relating to a further extended junction using means (for example in the form of a processor with associated memory) for selecting a further node in the database, and means (for example in the form of a processor with associated memory) for identifying one or more further edges connected to the selected node and means (for example in the form of a processor with associated memory) for meeting the same or further predetermined criteria, and further outputting the further data relating to the further extended junction.

A further aspect of the invention provides apparatus for processing data representative of a geographical network, which network is formed from nodes connected by edges, comprising means (for example in the form of a processor with associated memory) for selecting an edge; means (for example in the form of a processor with associated memory) for analysing the portion of the network adjacent to the selected edge to determine whether the edge is an element of an artefact; and means (for example in the form of a processor with associated memory) for processing the selected edge in dependence on the result of the analysis.

The means for analysing preferably comprises means (for example in the form of a processor with associated memory) for determining whether the configuration of the portion of the network adjacent to the selected edge satisfies predetermined criteria. The network is a preferably a road network, and the means for analysing the network preferably comprises means (for example in the for of a processor with associated memory) for determining whether the edge forms part of a traffic island.

There is also provided in another aspect of the invention apparatus for processing data representative of a geographical network, the apparatus comprising (a) means (such as a processor and associated memory) for retrieving the data from a database, (b) means (such as a processor) for processing the data in accordance with a modification algorithm, and (c) means (such as an output) for outputting the processed data.

The apparatus for presenting data preferably comprises means (for example in the form of a processor with associated memory) for geometrically simplifies the data using the modification algorithm. The data preferably includes a plurality of nodes, and the apparatus provides means (for example in the form of a processor with associated memory) for adjusting the relative positions of the nodes. The data preferably includes a plurality of edges, and the apparatus comprises means (for example in the form of a processor with associated memory) for adjusting the relative angles between at least two such edges.

This means for adjusting the relative angles preferably comprises means (for example in the form of a processor with associated memory) for snapping the relative angles of at least two edges to one of a set of preferred angles and means (for example in the form of a processor with associated memory) for adjusting the relative angles of at least two edges to be parallel or anti-parallel.

The apparatus for presenting data preferably includes: (a) means (for example in the form of a processor with associated memory) for identifying preferable alignment relationships between different elements of the data; and (b) means (for example in the form of a processor with associated memory) for adjusting the relative positions of the elements so as to provide an arrangement which best satisfies the identified alignment relationships. The data includes at least one node and at least one edge connected to the node(s) and is representative of at least one junction exit. The apparatus therefore preferably comprises means (for example in the form of a processor with associated memory) for identifying at least one edge as a junction exit; means (for example in the form of a processor with associated memory) for identifying preferable alignment relationships between the or each junction exit; and means (for example in the form of a processor with associated memory) for adjusting the relative positions and/or angles of the junction exits so as to provide an arrangement which best satisfies the identified alignment relationships.

The apparatus for presenting data preferably further comprises means (for example in the form of a processor with associated memory) for computing a measure of the strength of the alignment relationships in dependence on the similarity of the geometry of the elements to a predetermined relationship, such as a parallel or anti-parallel relationship.

The apparatus for processing data preferably comprises means (for example in the form of a processor with associated memory) for preserving anti-parallel relationships between pairs of edges in preference to parallel relationships between pairs of edges when the data includes at least one node and at least one edge connected to the node(s).

When the data includes at least one node and at least one edge connected to the node(s), the apparatus for processing data preferably comprises means (for example in the form of a processor with associated memory) for identifying one or more of said edges as junction exits; and means (for example in the form of a processor with associated memory) for grouping the junction exits into clumps of junction exits which can be displayed as emanating from the same point. The apparatus preferably comprises means (for example in the form of a processor with associated memory) for minimising the number of clumps.

When the data including at least one node and at least one edge connected to the node(s), the apparatus for processing data preferably comprises: (a) means (for example in the form of a processor with associated memory) for identifying one or more of said edges as junction exits; (b) means (for example in the form of a processor with associated memory) for determining the angle of leach of the junction exit(s); and (c) means (for example in the form of a processor with associated memory) for modifying the data in accordance with the angle(s) of the junction exits.

The apparatus for processing data preferably comprises means (for example in the form of a processor with associated memory) for defining the junction exit by a series of polyline segments at different angles, and means (for example in the form of a processor with associated memory) for determining the angle of the junction exit by analysing the polyline segments to determine a representative angle.

The apparatus for processing data preferably comprises means (for example in the form of a processor with associated memory) for outputting the selected or processed data comprising means (for example in the form of a processor with associated memory) for outputting the data as graphical data, preferably in the form of a graphical schematic. The apparatus preferably comprises means (for example in the form of a processor with associated memory) for aligning the graphical data with a selected screen geometry.

The apparatus for processing data preferably further comprises: means (for example in the form of a processor with associated memory) for receiving route data defining a route as a set of nodes; means (for example in the form of a processor with associated memory) for computing a measure of the significance of one such node; and means (for example in the form of a processor with associated memory) for processing the route data in accordance with the computed significance.

This is provided independently. There is therefore further provided apparatus comprising means (for example in the form of a processor with associated memory) for processing data representative of a geographical network, comprising: means (for example in the form of a processor with associated memory) for receiving route data defining a route as a set of nodes; means (for example in the form of a processor with associated memory) for computing a measure of the significance of one such node; and means (for example in the form of a processor with associated memory) for processing the route data in accordance with the computed significance.

The apparatus for processing data preferably comprises means (for example in the form of a processor with associated memory) for computing a measure of the significance of a node comprising means (for example in the form of a processor with associated memory) for classifying the node as one of significant and insignificant.

The apparatus for processing data preferably comprises means (for example in the form of a processor with associated memory) for computing a measure of the significance of a node comprising means (for example in the form of a processor with associated memory) for retrieving a first parameter associated with a first edge connected to the node and a second parameter associated with a second edge connected to the node; and means (for example in the form of a processor with associated memory for comparing the first and second parameters.

The first parameter preferably comprises a classification associated with the first edge and the second parameter comprises a classification associated with the second edge. Alternatively or in addition, the first and second parameters may comprise road names associated with the first and second edges respectively.

The apparatus for processing data preferably comprises means (for example in the form of a processor with associated memory) for associating the first parameter comprising a road name with the first edge and the second parameter comprising a road name with the second edge.

The apparatus for processing data preferably further comprises means (for example in the form of a processor with associated memory) for segmenting the route into a plurality of route segments in accordance with said computed significance.

The apparatus for processing data preferably comprises means (for example in the form of a processor with associated memory) for computing a measure of the significance of each of a plurality of such nodes.

The apparatus for processing data preferably comprises means (for example in the form of a processor with associated memory) for segmenting the route into a plurality of route segments in accordance with said computed significances.

The apparatus for processing data preferably comprises means (for example in the form of a processor with associated memory for segmenting the route into a plurality of route segments, where segmenting the route comprises generating a route segment bounded by two significant nodes.

The apparatus for processing data preferably comprises means (for example in the form of a processor with associated memory) for segmenting the route into a plurality of route segments, the route having a start node and an end node, and means (for example in the form of a processor with associated memory) for segmenting the route comprising means (for example in the form of a processor with associated memory) for generating a plurality of route segments each bounded by two significant nodes or by one significant node and one of the start and end nodes.

The apparatus for processing data preferably comprises means (for example in the form of a processor with associated memory) for segmenting the route into a plurality of route segments, further comprising means (for example in the form of a processor with associated memory) for further segmenting one of the plurality of route segments if the segment exceeds a pre-determined length.

The apparatus for processing data preferably comprises means (for example in the form of a processor with associated memory) for, segmenting the route into a plurality of route segments, further comprising means (for example in the form of a processor with associated memory) for further segmenting one of the plurality of route segments if the segment comprises more than a pre-determined number of insignificant nodes.

In a further aspect there is provided apparatus for providing a graphical schematic of a location, the apparatus comprising (a) means (such as a processor and associated memory) for selecting one or more of points of interest from a database in accordance with a predetermined selection algorithm, (b) means (such as the same or a further processor and associated memory) for generating a graphical schematic including the selected points of interest; and (c) means (such as an output) for outputting the graphical schematic.

The apparatus for providing a graphical schematic of a location preferably comprises: (a) means (for example in the form of a processor with associated memory) for ranking a plurality of points of interest; and (b) means (for example in the form of a processor with associated memory) for selecting one or more of the points of interest in accordance with their rank.

The apparatus for providing a graphical schematic of a location preferably comprises: (a) means (for example in the form of a processor with associated memory) for retrieving one or more stored parameters associated with each point of interest; and (b) means (for example in the form of a processor with associated memory) for selecting one or more of the points of interest in accordance with their associated stored parameter(s).

The apparatus for providing a graphical schematic of a location preferably comprises: (a) means (for example in the form of a processor with associated memory) for selecting a location; and (b) means (for example in the form of a processor with associated memory) for selecting one or more points of interest within a predetermined radius of the selected location.

The database includes a plurality of nodes; the apparatus for providing a graphical schematic of a location preferably comprises: (a) means (for example in the form of a processor with associated memory) for selecting a node; (b) means (for example in the form of a processor with associated memory) for defining a region surrounding the node; and (c) means (for example in the form of a processor with associated memory) for selecting points of interest within the defined region.

The apparatus for providing a graphical schematic of a location preferably comprises means (for example in the form of a processor with associated memory) for defining a region surrounding the node comprising means (for example in the form of a processor with associated memory) for defining a circular region centred on the node.

The apparatus for providing a graphical schematic of a location preferably comprises means (for example in the form of a processor with associated memory) for selecting one or more of points of interest from the database in accordance with the visibility of the points of interest.

The apparatus for providing a graphical schematic of a location preferably comprises means (for example in the form of a processor with associated memory) for selecting one or more of points of interest from the database in accordance with the time of day.

The apparatus for providing a graphical schematic of a location preferably comprises means (for example in the form of a processor with associated memory) for storing a list of favourite points of interest associated with a particular user, and means for example in the form of a processor with associated memory) for preferentially selecting points of interest stored in the list.

A further aspect of the invention provides apparatus for providing a graphical schematic of a location, comprising: (a) means (for example in the form of a processor with associated memory) for calculating a direction; (b) means (for example in the form of a processor with associated memory) for generating a graphical schematic including information which indicates the direction calculated in step a); and (c) means (for example in the form of a processor with associated memory) for outputting the graphical schematic.

There is further provided apparatus for providing a graphical schematic of a location, comprising: (a) means (for example in the form of a processor with associated memory) for calculating a direction; (b) means (for example in the form of a processor with associated memory) for generating a graphical, schematic including information which indicates the direction calculated with means (a); and (c) means (for example in the form of a processor with associated memory) for outputting the graphical schematic. The information preferably comprises a marker. The marker preferably comprises an arrow.

The graphical schematic preferably includes a junction including an incoming road segment taken into the junction and an outgoing road segment taken out of the junction. The apparatus for providing a graphical schematic of a location preferably comprises means (for example in the form of a processor with associated memory) for determining the angle between the incoming and outgoing road segments and means (for example in the form of a processor with associated memory) for selecting the information in means (b) above in accordance with the angle.

The number of arrows included in the graphical schematic preferably varies in accordance with the angle.

The apparatus for providing a graphical schematic of a location preferably comprises: (a) means (for example in the form of a processor with associated memory) for determining the current position of the moon or sun; and (b) means (for example in the form of a processor with associated memory) for outputting data which indicates the current position of the moon or sun determined with means (a).

There is provided as a further aspect of the present invention, apparatus for providing a graphical schematic of allocation comprising: (a) means (for example in the form of a processor with associated memory) for determining the current position of the moon or sun; (b) means (for example in the form of a processor with associated memory) for generating a graphical schematic of the location, the schematic including information which indicates the current position of the moon or sun determined in step (a); and (c) means (for example in the form of a processor with associated memory) for outputting the schematic generated in step (b). The information preferably comprises a marker. The position of the marker within the schematic is preferably dependent on the current position of the moon or sun. The marker preferably comprises a shadow image, the configuration of the shadow image being dependent on the current position of the moon or sun.

A further aspect of the invention provides apparatus for providing graphical schematic data, comprising: (a) means (for example in the form of a processor with associated memory) for receiving configuration data; (b) means (for example in the form of a processor with associated memory) for generating a graphical schematic in accordance with the configuration data received in step (a); and (c) means (for example in the form of a processor with associated memory) for outputting the graphical schematic generated in step (b).

The schematic is preferably output to a device, and the configuration data is preferably indicative of a property of the device. The property is preferably the screen resolution of the device. The configuration data is preferably indicative of a user preference.

A yet further aspect of the invention provides apparatus for providing a graphical schematic of a location, comprising: (a) means (for example in the form of a processor with associated memory) for selecting a network element from a database; (b) means (for example in the form of a processor with associated memory) for selecting a point of interest from a database in accordance with a predetermined selection algorithm; (c) means (for example in the form of a processor with associated memory) for determining a geometrical relationship between the network element selected in step (a) and the point of interest selected in step (b); (d) means (for example in the form of a processor with associated memory) for generating an abstract representation of the point of interest in accordance with the geometrical relationship determined in step (c); (e) means (for example in the form of a processor with associated memory) for generating a graphical schematic including the set of network elements selected in step (a) and the abstract representation of the point of interest generated in step (d); and (f) means (for example in the form of a processor with associated memory) for outputting the graphical schematic.

The geometrical relationship preferably relates to the visibility of the point of interest from the edge. The geometrical relationship preferably relates to the apparent size of the point of interest from the edge. The geometrical relationship relates to the distance of the point of interest from the edge.

The abstract representation of the point of interest preferably comprises an abstract frontage of the point of interest, directed towards the edge.

A yet further aspect of the invention provides apparatus for providing a graphical schematic of a location bounded by a defined geographical area, comprising: (a) means (for example in the form of a processor with associated memory) for selecting one or more of points of interest falling outside the defined geographical area from the database; (b) means (for example in the form of a processor with associated memory) for generating a graphical schematic of the defined geographical area, the graphical schematic including an indication of the direction of the point(s) of interest falling outside the defined geographical area; and (c) means (for example in the form of a processor with associated memory) for outputting the graphical schematic generated in step (b).

The graphical schematic preferably also includes an indication of the distance to the point(s) of interest falling outside the defined geographical area.

The graphical schematic preferably includes first source data from a first source and second source data from a second source.

A further aspect of the invention provides apparatus for providing a graphical schematic, comprising: (a) means (for example in the form of a processor with associated memory) for obtaining first source data from a first data source; (b) means (for example in the form of a processor with associated memory) for obtaining second source data from a second data source; (c) means (for example in the form of a processor with associated memory) for generating a graphical schematic including said first source data and said second source data; and (d) means (for example in the form of a processor with associated memory) for outputting said graphical schematic generated in step (c).

The apparatus for providing a graphical schematic preferably comprises: (a) means (for example in the form of a processor with associated memory) for identifying a first feature in the first data source; (b) means (for example in the form of a processor with associated memory) for identifying a second feature in the second data source; (c) means (for example in the form of a processor with associated memory) for determining whether the second feature overlaps with the first feature; and (d) means (for example in the form of a processor with associated memory) for associating the second feature with the first feature if the second feature overlaps with the first feature.

The data or schematic is preferably generated by, processed by and/or output from a central server; the apparatus for providing a graphical schematic preferably comprises means (for example in the form of a processor with associated memory) for receiving and displaying the data or schematic at a mobile client device.

The apparatus for generating data representative of a geographical network preferably comprises a mobile device and preferably any further comprises a server connected to the mobile device via a wireless network.

There is provided a further aspect of the invention in the form of a mobile device adapted to carry out a method as herein described. There is also provided a central server adapted to carry out a method as herein described, comprising means (for example in the form of a processor with associated memory) for communicating with a plurality of mobile devices.

There is provided a system comprising apparatus as herein described and a mobile device.

The invention also provides a computer program product adapted to carry out a method as herein described, as well as a computer readable medium having stored thereon the computer program product and a signal tangibly embodying the computer program product. There is also provided a method of transmitting the signal.

In a further aspect the invention provides apparatus including features for performing the method steps described above in any aspect of the invention. Typically the apparatus is in the form of an appropriately programmed computer. In a preferred example the apparatus is in the form a central server remotely located from a user, where the user may be a Location Based Service (LBS) and/or a mobile client device. The central server is typically configured to generate and output schematics to the LBS and/or mobile client device. The mobile device (typically a hand-held device) is appropriately configured to receive and present schematics (typically in graphical form) to a user.

The invention also provides any method as described herein as performed at a mobile client device; and a mobile client device for carrying out any of the methods described herein and/or embodying any of the apparatus features described herein.

The disclosed methods of and apparatuses for providing graphical schematics of locations may be freely modified to generate data representative of geographical networks and vice versa.

In any of the methods and apparatus features described herein, schematics or route information may be presented to a user in a graphical form. Alternatively or in addition, schematics or route information may be presented to a user in a non-graphical form such as text or voice. Graphical schematics may typically incorporate or be derived from conventional mapping data and may be derived from several data sources, including data relating to context information such as points of interest, for example buildings. Schematics preferably provide a simplified view of the underlying data, for example by modifying characteristics of the geographical features shown, such as road lengths, relative angles and relative positions of features an the like. In some embodiments schematics may comprise map extracts, which may be unsimplified or accurately drawn.

The method and apparatus features described herein may typically be used as part of a routing application or service. This may be a routing service for providing routing information to a mobile user, preferably a pedestrian user, via a mobile client device. This routing information may typically relate to roads, footpaths and other pathways accessible to the user. In one example, the service may operate in the context of a trade show or exhibition, for example to enable a user to find a particular stand.

The invention also provides a computer program and a computer program product for carrying out any of the methods described herein and/or for embodying any of the apparatus features described herein, and a computer readable medium or carrier (for example a disc) having stored thereon a program for carrying out any of the methods described herein and/or for embodying any of the apparatus features described herein.

The invention also provides a signal embodying a computer program for carrying out any of the methods described herein and/or for embodying any of the apparatus features described herein, and a signal embodying a graphical schematic or other data representative of a geographical network generated in accordance with a of the methods described herein, a method of transmitting such any such signal, and a computer product having an operating system which supports a computer program for carrying out any of the methods described herein and/or for embodying any of the apparatus features described herein.

Features implemented in hardware may generally be implemented in software, and vice versa. Any references to software and hardware features herein should be construed accordingly.

Any feature in one aspect of the invention may be applied to other aspects of the invention, in any appropriate combination. In particular, method aspects may be applied to apparatus aspects, and vice versa.

DESCRIPTION OF THE DRAWINGS

Preferred features of the present invention will now be described, purely by way of example, with reference to the accompanying drawings, in which:—

FIG. 6 illustrates segmentation of the data set of FIG. 5;

FIG. 7 is a view of a set of route edges associated with a route;

FIG. 8 shows a geometrically simplified version of FIG. 7, including four sectors associated with one of the junctions;

FIG. 15 shows a map of a road network;

FIGS. 16A, 16B and 16C show examples of abstract representations of the road network of FIG. 15;

FIG. 17 shows road network data representing the road network;

FIGS. 23A, 23B and 23C illustrate the simplification of a network comprising two edges having a near-parallel relationship;

FIGS. 24A, 24B and 24C illustrate the simplification of a network comprising two edges having a near anti-parallel relationship;

DETAILED DESCRIPTION OF THE INVENTION

1. Overview 1.1 Architecture

Figure 1:
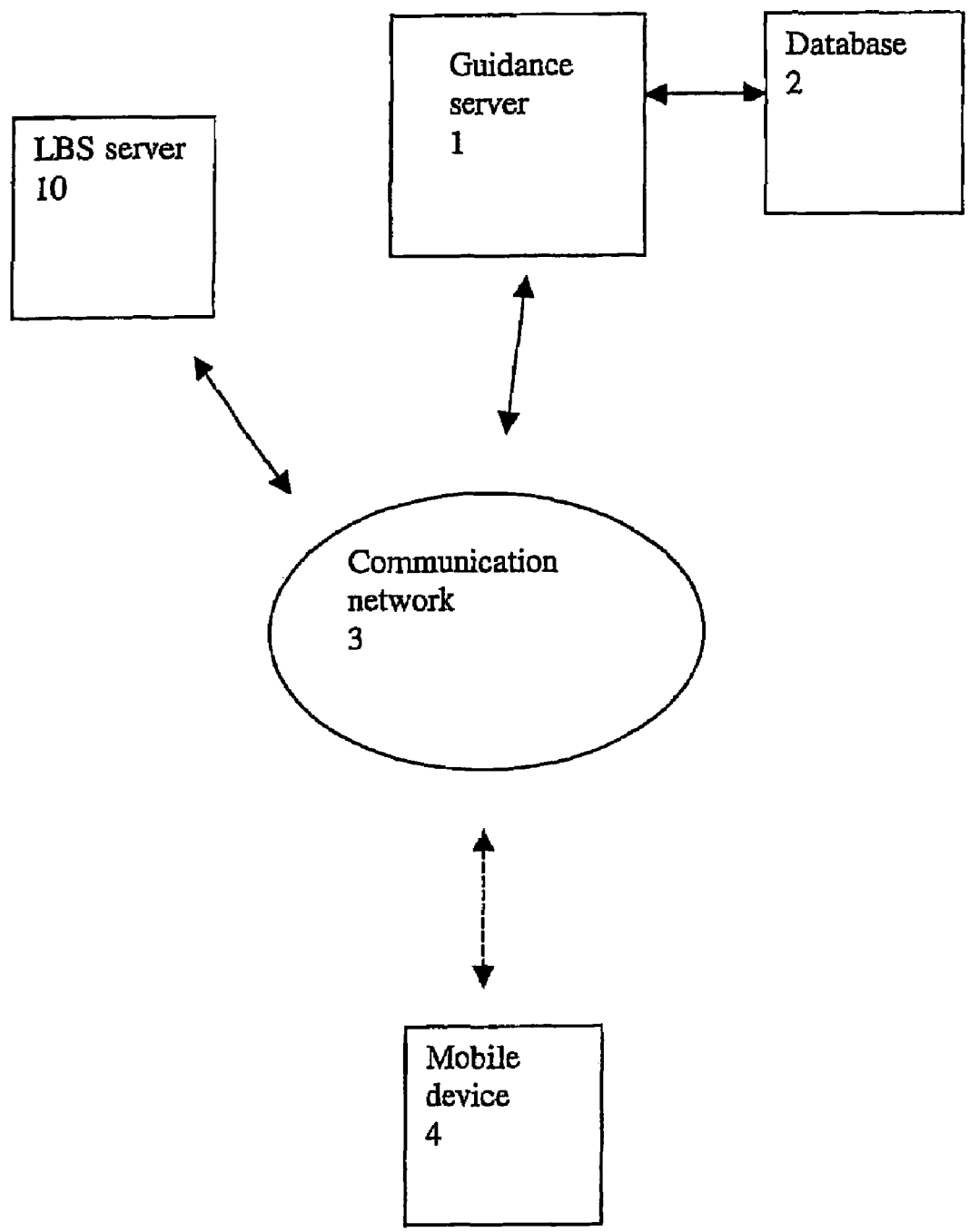
FIG. 1 is a schematic drawing of the basic system hardware.

A basic system hardware architecture is shown in FIG. 1. A location/guidance server 1 is connected to a database 2 and communication network 3. The communication network 3 communicates with a mobile device 4 via a wireless link. A Location Based Service (LBS) server 10 is also connected to the communication network 3.

1.1.1 Mobile Device

Mobile device 4 is typically a hand-held device such a mobile phone or personal digital assistant (PDA). The mobile device 4 may have a significantly smaller screen, lower data transfer rate and more limited user interface than is found in equivalent browser/hardware arrangements for the fixed Internet. Two different classes of mobile device are considered here (though in other embodiments, different kinds of devices may be used): small devices and medium devices.

Small and medium devices differ in certain characteristics, including screen resolutions, colour/monochrome displays and user interaction methods. For example, smaller devices such as Wireless Application Protocol (WAP)-enabled mobile telephones (one example being the Siemens S45 mobile phone) would typically have small, monochrome displays, using standard mobile telephone keys and WAP menus for user interaction. Medium size devices may have slightly larger screen resolutions (typically no less than 120×120 pixels) and may have colour displays. An example of such a device is the Trium Eclipse mobile phone. The information generated for small and medium devices is generally different and takes into account the different characteristics of the devices.

The approach taken for medium size devices is also applicable to larger devices such as the Compaq Ipaq or Nokia 9210, which typically have larger resolution colour displays and use a point-and-click interface, which may be operated using a stylus. Therefore, "medium devices" shall be taken to include such devices. In fact, techniques described for small and medium devices may be applied to devices of any size. Furthermore, according to user preference, schematics described below for medium devices can be used on small devices, particularly if limited to a view of a single junction.

The mobile device 4 may also be a General Packet Radio Service (GPRS) device.

In some embodiments, certain aspects of the routing service may be accomplished by executing software on the mobile device. For example, the mobile device may comprise: a Java a virtual machine or a browser capable of executing scripts in languages such as JavaScript.

1.1.2 Server

The location/guidance server 1 comprises software modules for location identification and for the generation of routing information such as route schematics as well as interfaces to users of the location/guidance server and to database 2.

Schematics

The information provided by the server 1 is generally in the form of schematics. In some cases the schematics may be non-graphical: for instance in the form of textual or voice data. However in most cases the schematics include graphical information in the form of simplified maps, and are derived from conventional mapping and geographical data. Graphical schematics may be in formats including bitmap, Joint Photographic Experts Group (JPEG), Graphic Interchange Format (GIF), Portable Network Graphics (PNG) or a vector graphics format. Schematics may be transmitted to the mobile device by standard protocols such as WAP or Hyper Text Transfer Protocol (HTTP), or by a proprietary protocol.

The schematics include only such information as is useful and necessary for a routing task, or other task. For example, schematics typically include representations of road layouts along with context information, such as prominent buildings or landmarks. Context information of this kind will be referred to as Points Of Interest, or POIs in abbreviation.

Schematics are commonly labeled with textual information to help the user recognise the various features.

Routine Schematic Types

Various types of schematic are available, each with a specific role in the routing/guidance process. There are three major types of schematics: orientation schematics, location schematics and routing schematics.

Orientation schematics assist users to find their current location before following a route. Location schematics are similar to orientation schematics but are not related to a route; they simply provide an overview of a geographical area.

Routing schematics indicate the correct route to the user using symbols such as arrows or by highlighting the required roads. Routing schematics can be further classified as junction and non-junction schematics. Junction schematics indicate how a user should proceed at a junction of two or more roads. Non-junction schematics illustrate landmarks along sections of the route that do not contain major junctions, to allow the users to gauge their progress along the route.

Routing schematics typically represent part of a route; but overview schematics may be provided which describe a route in its entirety.

The nature of the routing schematics that are generated is in part dependent upon the functionality of the mobile device 4. In general, more detailed routing information can be displayed on large and medium mobile devices than on small mobile devices.

Instead of presenting the user with a graphic schematic, the device may present information in the form of text only, and/or as a synthesised voice.

The routing service generates the most appropriate form of schematic based on knowledge of the mobile device, which may be stored in a database of user information or may be transmitted by the device with each routing request or at the start of each routing session.

Small Screen Routing Schematics

For devices with small screens, the routing schematics are typically:

Junction schematics: at junctions, either a detailed, accurate view or a simplified abstract representation of the junction, along with arrows to indicate movement through the junction and points of interest to help the user work out where he is.

Non-junction schematics: between junctions, a schematic of simplified road layout and key points of interest.

Depending on requirements, non-junction schematics may be omitted, and only junction schematics displayed.

Medium Screen Routing Schematics

For devices with medium screens, the routing schematics are typically:

Consecutive schematics of sections of the route. The user steps through these as he progresses down the route.

Each display covers multiple junctions, with routes indicated through and between each.

Selected points of interest (landmarks, buildings, street furniture) around and between junctions are displayed.

Most detail is displayed at the junctions. The number of junctions is generally two, but may vary.

Large Screen Routing Schematics

Like the medium screen equivalents, here more than one junction is typically shown per screen.

1.1.3 LBS

A Location Based Service (LBS)—also known as a Location Based Application or Location Enabled Application—is run on a second server 10 which is also connected to the communication network 3. The LBS is an application which uses the location/guidance services of server 1 as part of a larger application. Many examples of such applications may be imagined—one such example might be a restaurant guide which provides a user with information regarding a restaurant close to his present location, including reviews of and directions to the restaurant.

Although in a preferred embodiment, services ale offered for use by LBSs, in some embodiments location/guidance server 1 may provide services, for example a complete location and routing service, directly to the mobile device via communication network 3.

1.1.4 Database

Database 2 contains geographical information used by location/guidance server 1 in the identification of locations and generation of routing information. The geographical information includes information on roads, road names and classifications, buildings and building classifications, business names and business classifications, full address data and other geographical and mapping features. In some embodiments, database 2 comprises a single homogeneous database. In the preferred embodiment, database 2 comprises several heterogeneous data sources, such as databases and files.

All the data used by the system is commercially available. There are numerous alternative sources of data in the UK, and equivalents (with different degrees of comprehensiveness and accuracy) in other countries. For example, the following different classes of data may be used for the UK:

Large scale cartographic data (for example Ordnance Survey MasterMap). This includes building outlines (used, for example in POI calculations), and may also be used to locate features such as rivers and parkland to be represented on schematics. As will be described later, schematics typically provide junction views which are represented schematically or by displaying a small but accurately drawn extract from the cartographic data covering the junction of interest (i.e. a small map), with the outlines of POI buildings highlighted and labelled.

Road network data (for example TeleAtlas), which includes connections between roads (e.g. at junctions), absence of connections between roads that cross but do not connect, (e.g. flyovers), classification of roads (Motorway, A, B etc), some pedestrian paths/walkways, and identification of separate road geometries that make up the same complex road layout (e.g. junctions, roundabouts, dual carriageways). Similar data is also available from NavTech and Ordnance Survey.

POI data (for example E-street and Ordnance Survey AddressPoint), that consists of points with attributes, and classifications identifying the nature and specific details of potentially interesting things in the real world (shops, restaurants, landmarks etc). The AddressPoint data has a point for every address in the country, but includes only 'vanilla', information like name (in some cases, particularly businesses), number, and postcode. The E-street data identifies a smaller number of points, but with much better classification and information about what and who they represent. POI data is used in the POI selection step.

There are other suppliers of data that may be used by the system.

1.1.5 Software Structure

The location/guidance server 1, in combination with database 2, provides a locating, routing and guidance 'web service', accessible through Internet-like protocols to the LBS running on server 10. The web service provides an Application Program. Interface (API) to LBS developers.

Figure 2:
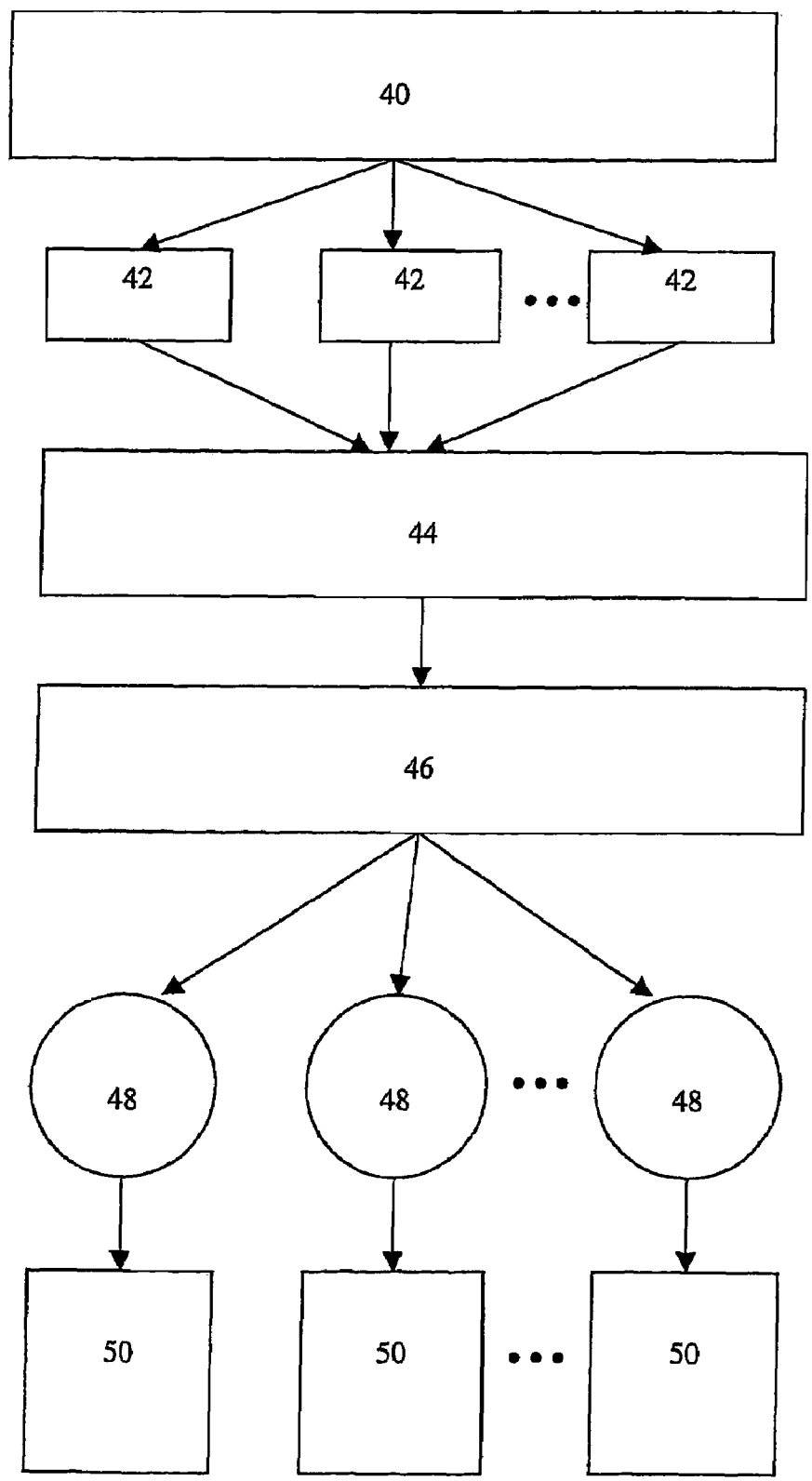
FIG. 2 is a schematic drawing of the software architecture.

The structure of the software that provides this web service will now be described in more detail with reference to FIG. 2. The location/guidance technology includes a number of layers, including:

Web service interface 40 provides the API and infrastructure to allow the LBS to access the location/guidance technology and to allow the location/guidance technology to manage multiple users for the LBS.

The service modules 42 are software modules which provide various aspects of the location/guidance services, including identifying locations and generating schematics.

The feature model 44 is a data model which supports the service modules.

The feature store 46 is a mechanism for overall management of data, providing a single common interface to all data regardless of the source from which it is drawn.

The connectors 48 are interface modules which allow data stored on disk in different formats to be accessed efficiently and presented to the higher parts of the system through a common interface at the feature store level.

Data sources 50 are files and/or databases on disk, either in third party formats where databases have been supplied by third parties, or in proprietary formats.

For example, referring back to FIG. 1, following interaction between LBS server 10 and mobile device 4, LBS server 10 makes a routing request to guidance server 1. Referring now to FIG. 2, this request is received by web service interface 40, which invokes the appropriate one (or possibly several) of service modules 42. The invoked module then requests any required data from feature store 46 using feature model 44. Feature store 46 identifies the source(s) of the required data, and fetches the data from one or more of data sources 50 using the appropriate connector(s) 48.

1.1.6 Indexing Method

A method of indexing geographical features will now be described. The method is used by the system to find features in a given area.

The indexing method splits a large map (for instance a map of the UK) into a grid of patches or tiles. This grid is not necessarily uniform as different tiles may be of different sizes. Each tile includes a list of features located in the geographical area represented by the tile, including roads or POIs such as transport nexuses or shops. Generally, large tiles are used to represent geographical areas with a low density of features, while areas containing a high density of features (for example, urban areas) are represented by small tiles. Since the tiles are of different sizes, it is not possible to directly locate correct tile solely using known coordinates. Therefore, several layers of tiles at successively lower resolutions are provided, such that in the highest layer a single tile covers a large area and lists all the tiles in the next layer which are enclosed within the area of the higher layer tile.

The indexing algorithm identifies the correct tile by searching downwards through the hierarchy of tiles. In this way, the algorithm searches until it locates the final (highest resolution) tile, which covers an actual geographical area, and lists the features within that area.

The advantage of this indexing scheme is that it is easy to quickly access all the information relating to a specific geographical area if a single tile does not cover the area of interest, several surrounding tiles are examined. In some embodiments, separate servers each cache information covering a certain area.

1.2 Service Overview

Generally speaking, the location/guidance server 1 provides the following services which are implemented by service modules 42:

Identifying a mobile device user's present location
identifying a user's desired destination
Generating routing information for routing the user from his present location to his desired destination.

Individual Location Based Services may use only aspects of the services provided. For example, LBS server 10 may request routing information only, providing starting and finishing locations as parameters of the request.

Alternatively, these services may be combined to provide a complete location and guidance service incorporating the three steps of identifying the device's present location, identifying a desired location and providing routing information between the two.

1.3 Example Routing Service

Figure 3:
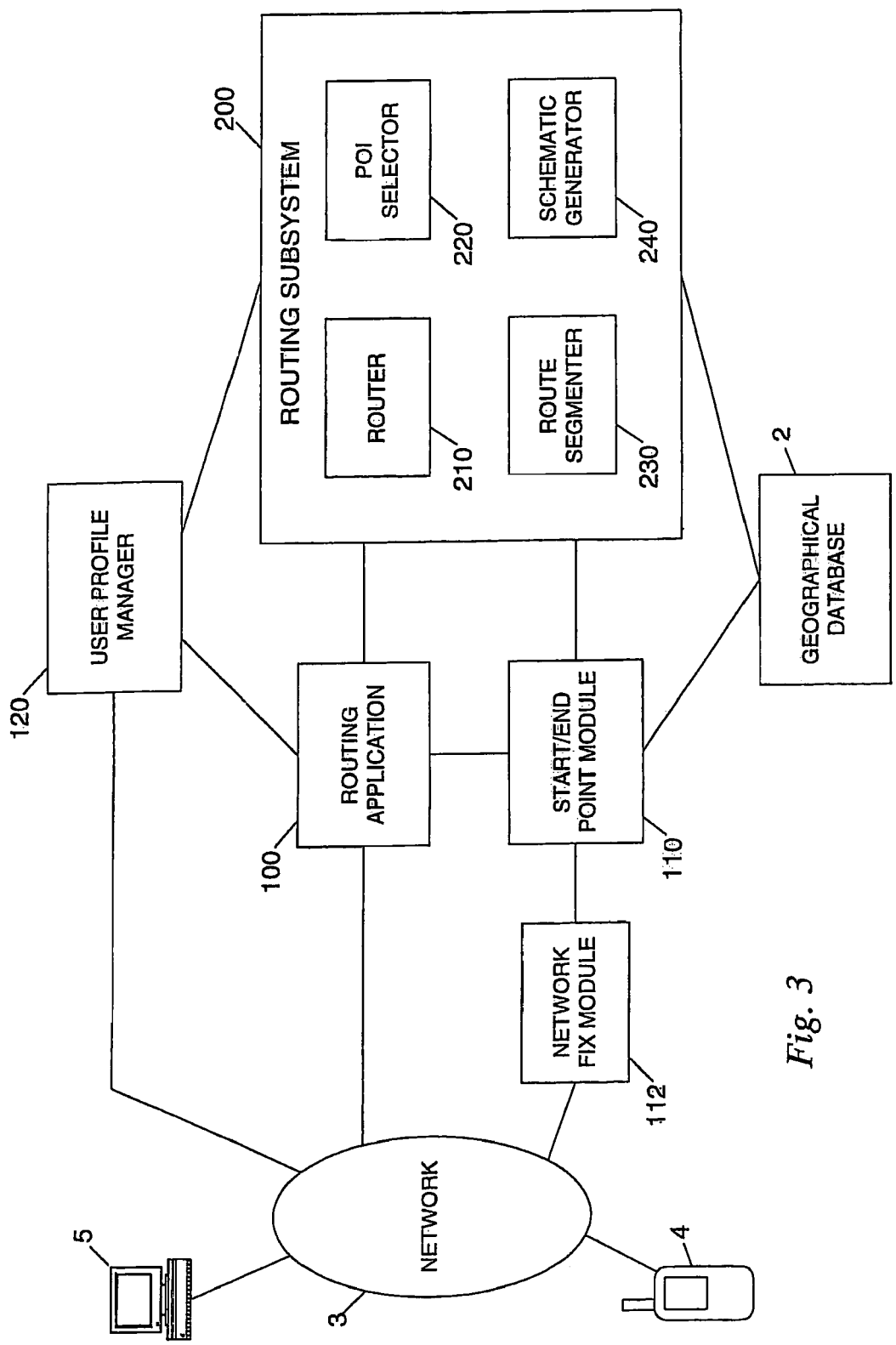
FIG. 3 is a schematic drawing of a location and guidance service.

An example of a location and guidance service will now be described in overview with reference to FIG. 3.

Routing and location-related queries are received from mobile device 4 via communication network 3 by routing application 100, which manages the interaction with the user of the routing service. A user interface is provided as part of the routing application, for example in the form of a Wireless Application Protocol (WAP) site. The user interface allows the user to perform tasks such as entering information relating to route start and end points and requesting routing information.

Start/end point module 110 provides services to the routing application, including determining and/or selecting start and end points for a routing request and for determining the location of a mobile device. It uses network fix module 112 to obtain location information relating to the location of mobile device 4 from communications network 3 if required.

Routing application 100 generates routing requests based on the user queries passes these to routing subsystem 200. These may, for example, comprise two or more geographical coordinates defining a route for which routing information is to be generated.

Routing subsystem 200 comprises router 210, POI selector 220, route segmenter 230 and schematic generator 240.

Router 210 identifies a route based on the received routing request. POI selector 220 selects relevant points of interest along the route to assist the user in following the route. Route segmenter 230 segments the route into separately displayable route sections. Schematic generator 240 generates route schematics of route segments, and may generate other types of schematics, such as route overview schematics, location schematics and orientation schematics.

Start/end point module 110 and routing subsystem 200 communicate with geographical database 2 to access geographical information.

A user profile manager 120 maintains information relating to registered users of the system, which is held in a user profile database (not shown). In some embodiments, some or all of the user-related information is instead or additionally held locally on the mobile device.

User profiles may comprise a variety of types of user information, including:

Identifying information (for example a user's mobile telephone number and mobile device type)

Usage histories (for example, recently/frequently visited places)

Preferences (for example, preferred start/end points, preferred POI types, software configuration preferences). In particular, a list of favourite, commonly used locations is held in the user profile. This is referred to as a "MyPlaces" list.

Users may communicate with the user profile manager using their mobile device 4 (for example, via a WAP site) or via some other device such as a computer terminal 5 connected to the communication network 3 (for example, via a World Wide Web site), and may update their user profiles according to their requirements.

Routing application 100 and routing subsystem 200 customise the routing service and the routing information generated based on information stored in user profiles, which they access via the user profile manager. Furthermore, routing application 100 may update user profiles via the user profile manager in response to user interaction. As an example, routing application 100 may allow a user to add locations to a list of preferred locations held in his user profile, and may automatically record history information relating to a user's routing queries in the user profile.

2. Routing Subsystem Overview

Returning to FIG. 3, the routing application 100 generates routing requests in response to interaction with a user during which the start and end points of the required route are identified. This routing request typically comprises the coordinates of the start and end points identified. The routing request is passed to the routing subsystem 200.

In response to such a routing request, the routing subsystem carries out the following tasks:

the required route is identified by router 210
POIs along the route are selected by POI selector 220
the route is segmented by route segmenter 230
the first of the sequence of route schematics is generated by schematic generator 240

The generated schematic is then passed back to the routing application for display to the user. When the user requests the next route schematic, the routing application sends a route update request to the routing subsystem, in response to which the next routing schematic is generated by the schematic generator.

3 Router

The router will now be described.

Geographical data sources such as TeleAtlas provide road information as a network of interconnected nodes, where edges represent road segments and nodes represent junctions where road segments meet. As well as representing roads, the edges may also represent footpaths or any other entities accessible to pedestrians. The desired route is found by identifying a path of connected nodes through the network from the starting location to the finish location.

The coordinates associated with the start and end locations specified in the routing request may not lie exactly on the road network nodes or road segments. For example, the data supplier may specify the location of a building by providing the coordinates of an arbitrary location within said building. In these, cases, the corresponding network node is calculated by searching for the nearest road segment to the start or end coordinate. If an address is associated with the start or end coordinate, then only those road segments matching this address are considered during this search. Restricting the search in this way increases the likelihood of finding a network point near to the relevant entrance to the building.

3.1. Route Selection Based on Shortest Route

The route selected may be the shortest route, either in terms of distance or journey time. Where the routing information is aimed at a pedestrian user whose speed is taken to be roughly constant regardless of the type off road (or footpath) used, the shortest distance and shortest travel time paths are likely to be the same. Therefore, given that distance information is readily available from the database, the shortest path is calculated in terms of distance.

This is achieved using conventional path finding algorithms. For example, from the starting point, the router explores all possible edges to get to the next node on each edge. It stores each of these as a possible partial route. As each new node reached, it explores all possible edges to new nodes, and again stores each as a set of possible partial routes. It does this until the destination is reached. In an enhanced, more efficient version, each possible partial route is assigned an estimated total cost (e.g. current distance, plus the straight line distance to the target from the current end of the route). At any stage, only the partial route with the lowest estimated total cost is explored. Once one route has reached the destination, only partial routes with estimated costs lower than the actual cost of that route are explored further. This results in a faster determination of the lowest cost route. The exact mechanism for estimating the total minimum cost of a route may vary if a cost other than simple distance is required.

3.2 Route Selection Based on User Profile

Alternatively, the route selection may be based on a user profile, or stored on the mobile device 4. For instance the user profile may specify that the route selection routine should seek to identify the safest route (for example, by not selecting footpaths or minor roads as part of the road).

3.3 Route Selection Based on User Input

Finally, the user may be able to select a particular route or constrain the route selected by specifying waypoints or other constraints, which are provided as parameters of the routing request.

3.3 Building Network Structure Around Route

After a route has been identified, a data set containing extra network structure is built around this route.

Figure 4:
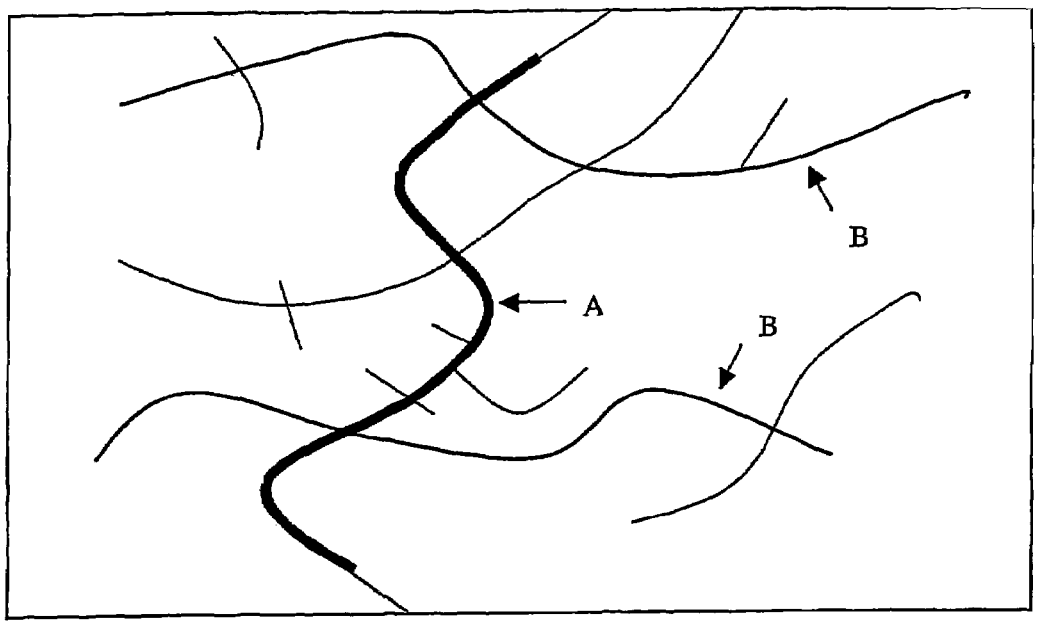
FIG. 4 is a view of a network.

Consider, as an example, the route through a network shown in FIG. 4.

The route itself is labelled 'A', roads labelled 'B' are major roads, other roads are minor roads. This type of classification is usually present in cartographical data (standard data from TeleAtlas may be used; or similar datasets are also available from NavTech and Ordnance Survey).

Starting from the route 'A', a data set of extra network structure is grown out from the route a set distance (currently 80 m). The growing algorithm follows those roads which are of equal or greater importance to the original route and adds portions of them to the data set, classifying them as 'route structure'. Roads which are of lesser importance are added to the data set as spurs (road stubs). If a complete road is included as 'route structure' but is less than the set distance, then the roads that it connects with are also analysed.

Junctions where the original route meets a road of equal or greater importance are classified as 'significant'. Other junctions ('insignificant' junctions) would typically correspond to spurs.

Figure 5:
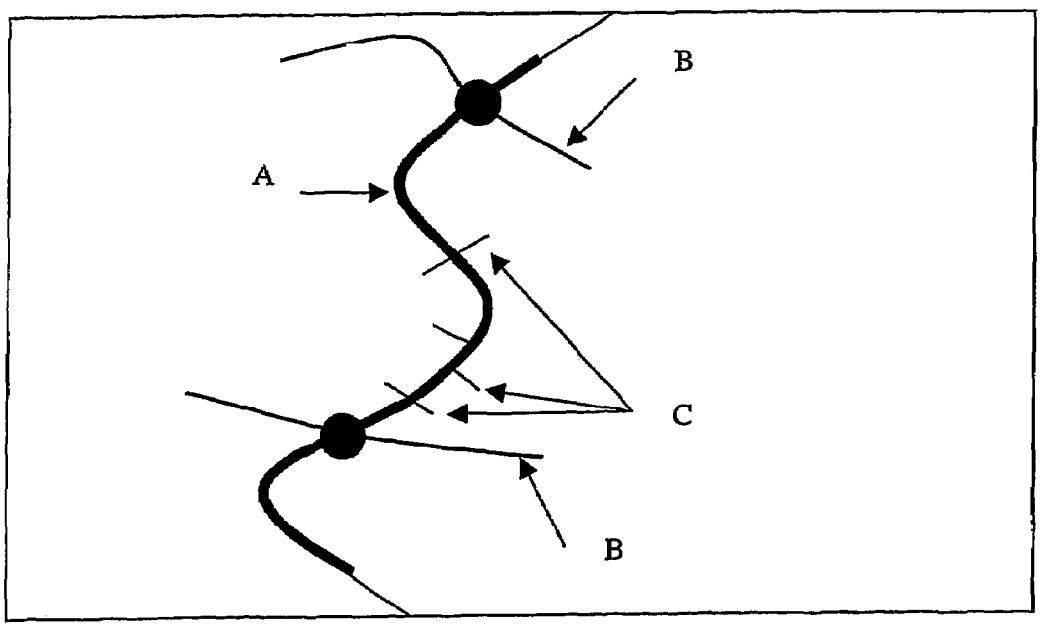
FIG. 5 illustrates a data set resulting from a growing algorithm performed on the network of FIG. 4.
Figure 9:
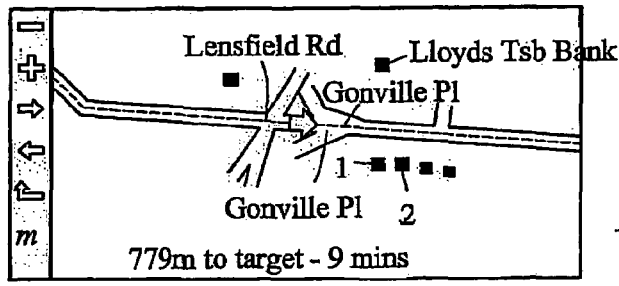
FIGS. 9 to 12 are exemplary schematics as generated by one embodiment of a schematic generator.
Figure 10:
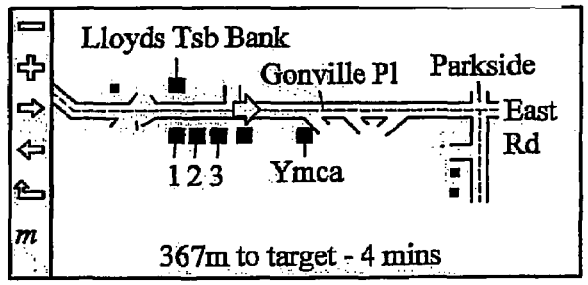
Figure 11:
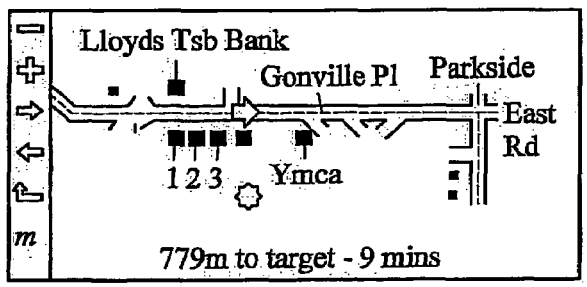
Figure 12:
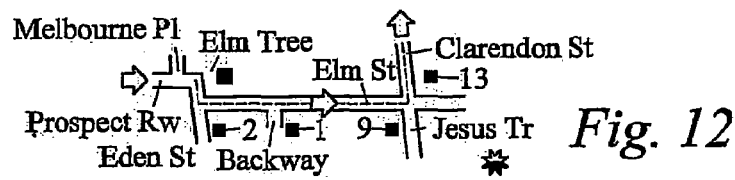

The data set resulting from the growing algorithm on the example network is shown in FIG. 5.

Those elements corresponding to the original route are labelled 'A', those labelled as 'route structure' 'B'. Elements labelled 'C' are 'spurs'. Significant junctions are marked with circles.

Once the route has been generated, the POI selector identifies points of interest along the route for possible inclusion in routing schematics. The route is then supplied to the segmenter which, in response to route update requests received from the user via the routing application, makes successive calls to the schematic generator to generate schematics for individual segments of the route.

During the process of routing the user along the route by presenting this sequence of schematics, the routing application may send a modified routing request. This may happen if, for example, the user becomes lost whilst following the route. In this case the existing route is discarded and a new route calculated based on the modified request.

4. POI Selector

Once the route has been calculated points of interest (POIs) such as prominent buildings are identified along the route for later display to the user. These help the user find his way along the suggested route. Various methods of selecting POIs are described below.

4.1. Sector Ranking

POIs near junctions are given particular importance as they can be referred to by the user when deciding which of several roads to take. To identify such POIs, a set of sectors is constructed around each junction. An example of this is given in FIG. 8.

Consider a route passing along network, elements 20,23, and 24. The junction comprising network elements 23-26 is divided into four sectors, each sector being bounded on two sides by an adjacent pair of roads and on the third side by a curved search radius 30-33 at a predetermined distance from the junction.

Each sector is assigned a sector ranking (a value between zero and one), giving preference to sectors that are adjacent to the route. Thus, in FIG. 8, sector 30 is bounded on two sides by network elements forming part of the route and therefore has a high ranking; sectors 31 and 33 are bounded on one side only and therefore have a medium ranking; and sector 32 is not bounded on any side and therefore has a low ranking.

4.2. POI Ranking

Each sector 30-33 is then searched for POIs and a ranking determined for the POIs found. A POI is a candidate if its geometry is contained by, or intersects with, the sector. The server 1 may search for POIs from a number of different data sources 50 (shown in FIG. 2). For instance, one of the data sources 50 may be the Ordnance Survey dataset known as MasterMap, which includes objects with a Polygon geometry property representing buildings. Another data source 50 may be the Ordnance Survey dataset known as AddressPoint that includes objects with a Point geometry property as well as address information for all postal destinations in the UK. The AddressPoint points lie inside the MasterMap Polygons, and can be used to give an address to a building. Another data source 50 may be the dataset provided by E-Street, which provides information on businesses, represented as single points with coordinates.

The ranking of each POI is calculated by adding together a number of contributions.

p1*significance Factor+
p2*onRouteFactor+
p3*labelFactor+
p4*distanceFactor+
p5*sectorRanking The various factors have a range of zero to one inclusive, and the parameter (p1,p2,p3,p4,p5) are provided as input to the POI selection algorithm.

The significanceFactor indicates how significant the, POI is based on what type of POI it is. For example a POI representing a cinema may be considered more significant than a POI representing a house. The mapping of POI type onto a significance band (typically no more than a dozen) is defined based on the types available. This mapping may be different depending on a user profile. For example pubs or bars may appear higher in the ranking for men than they do for women. In addition the significanceFactor includes a component that ranks larger POIs as more significant than smaller ones (this is applicable when the POI has a polygon geometry). This is calculated using the function described below that takes the square-root of polygon area as input and then divides it by the number of bands. The square-root is used since this provides a better estimate of how much of the POI faces the street.

The onRouteFactor returns a value between zero and one depending on how close the POI is to being 'on route'. If the address for the POI indicates that it is on the route, then it is assumed to be on route. Otherwise the nearest distance to the POI from the route is calculated; if this is below a threshold then the POI is assumed to be on route.

The labelFactor returns a value between zero and one depending on how much space the POI will require to label it in an image.

The distanceFactor returns a value between zero and one depending on how far the POI is from the junction/position being identified. This makes use of the function described below. The distance supplied to the function is the nearest distance between the POI geometry and the junction/position being identified.

The calculation of these factors makes use of a function that maps a value x onto a value in the range zero to one. This has the form $$1.0/(1.0+\exp((x-x0)/xk))$$

Typical values for the constants used in the POI ranking are given below, although it should be noted that an important feature of the system is the ability to change these values easily to tune the system for different types of data (for example, in different countries):

p1=3.0
p2=2.0
p3=1.0
p4=1.5
p5=1.2
x0=10.0 and xk=10.0 for areas in significance
x0=15.0 and xk=15.0 for distance from junctions
Label factor is 0.0 if label length is <15, and 1;0 otherwise.

4.2.1 Ranking Based on User Information

The POI ranking scheme described above may be augmented so that the POI selector makes use of information specific to the user to provide better-tailored routing information. For example:

Because the instruction is generated in near real-time the POI selector may use information about the current time and the location of the user when selection POIs. For example, the time of day may be compared to opening times of businesses, outlets or similar POIs, to help determine what might represent a suitable point of interest. For example, shops could be given higher priority for selection as a POI during times when they are open.

The POI selector may use locations from the user's personalised list of locations stored in his user profile (for example in a MyPlaces list), especially those that have been used frequently as a start point or end point of a route, as points of interest. Such points of interest can be given high priority to ensure that they are labelled and shown.

4.2.2 Selection of POIs Based on POI Visibility

The POI ranking scheme described above may be further adapted to select POIs based on the visibility of the POI. The visibility of the POI is determined using the following steps:

The POI is associated with a building from the cartographical data (such as that provided by MasterMap) and the nearest edge of the building to a road segment of the route is determined. If the address of the POI is directly on the route, that is to say the address matches, or partially matches, the road name of the road segment then the POI is deemed as visible.

Alternatively, if there is no address or the address does not match the route then the POI selector also checks if the building lies within a small distance tolerance of the route, in which case the POI is also deemed as visible. This allows, for example, a POI/building that is just off a corner of the route to be still included as a POI candidate, even though the postal address indicates that it does not lie on the route.

For POIs/buildings that are not very close to the route but have an address on the route the system performs a line of sight calculation to determine whether a given building or other structure is visible from a junction, or other point on the route. This prevents showing a POI that is actually hidden behind another building. For example, if the POI is a statue that is located within a building, then it is clearly not visible and hence is not considered as a POI candidate.

Shops, cinemas or other businesses that are part of well-known chains are given a higher priority for selection as POIs. A fixed list of chains is used for this purpose, listing relevant store names against which the business name of the POI in question is compared.

4.3 POI Data Access

In general, the geometry of a POI may be represented by a Point, Polyline or Polygon in the MasterMap data source. Other information relating to the same POI may be contained in other data sources such as the AddressPoint or E-Street datasets. Such information is associated with a geographical coordinate, but not a building outline.

The POIs from the different sources are represented in the feature store as POI Content objects, providing uniform access to POI information from separate data sources.

In some circumstances the POI in question may only have a Polygon geometry property within the sector being searched for points of interest. In such circumstances, a spatial search is carried out within the entire POI geometry to locate POIContent objects. The properties of these objects are then used as additional properties of the POI.

For example, a large building (such as a hospital) may be represented by a large polygon in the MasterMap dataset. This polygon may partially overlap with one of the sectors 30-33—for instance, only a corner of the building may be within a sector, with the rest of the building lying outside the sector. Therefore the building itself will be identified as a POI within the applicable sector. A POI within the building, for instance contained in the AddressPoint or E-Street dataset may fall outside the sector.

Therefore the POI selector searches the entire building for POIContent objects and treats them as additional properties of the building.

The POIContent objects themselves are not generally treated as POIs. This avoids the possibility of confusion between the POIs (in this case, the building outline polygons) and the objects spatially located within them that carry the other information about the POIs.

In some embodiments, POIContent objects are ignored when searching for POIs—they will only be reached, if needed, via the POIs. In other embodiments, however, POIContent objects not contained by a building (or similar polygon) are treated in their own right as POIs.

4.3.1 Data Merging

The system addresses various problems associated with merging data from different data sources. These problems largely relate to the data being held in different formats, or data from different sources having different names/identifiers for identifying features (or properties of features) of the same type. This is tackled by having a common interface to all connectors used to access data. The implementation of these connectors can thus present different data through a common interface. An object oriented data model is built on top of this interface.

More specifically, one of the problems with using data from different data sources is the problem of duplication of data. For instance the B-Street dataset may include a building name whose coordinates fall within a MasterMap polygon (for instance a building). The AddressPoint dataset may also include the same building name but at a slightly different position within the building. The interface correlates the building names from the two different sources and identifies that they both relate to the same building, thus avoiding duplication.

4.4 POI Selection

To select POIs used to identify the junction, the appropriate sector ranking is added to the POI rankings and all sectors are marked as 'in use'. To select a POI the highest ranked POI from the 'in use' sectors is selected. The POI is then removed from further consideration and the sector marked as 'not in use'. The process is repeated to select additional POIs. If all sectors are marked as 'not in use', then they are all marked as 'in use' again.

4.4.1 Introducing Virtual Junctions

Sometimes it is necessary to select POIs on a route 'leg' rather than at a route 'junction'. This is normally carried out if a route leg is judged to be greater than a threshold length. One or more virtual 2-arm junctions are introduced on the leg. The position of these virtual junctions are chosen to ensure that the resulting legs are neither too long (i.e. within a percentage typically 25%, of the threshold length), nor have too many spurs (typically no more than four). Where possible the virtual junction is added at an existing node in the network, otherwise it is introduced part-way along an edge.

4.4.2 Orientation Schematic POI Selection

In the case of Orientation Schematics (described above), POIs are identified for the junctions using a modified form of the POI location described above under the heading "Directions". In this case the. 'onRouteFactor' and 'sectorRanking' are always set to zero. Additional sectors are constructed for any Polygons entirely bounded by paths between identified junctions.

4.4.3 Location Schematic POI Selection

In the case of Location Schematics (described above), POIs are selected for a location schematic based on their significanceFactor. Other elements of the POI ranking are ignored. The area of the schematic is chosen to include at least two and ideally more POIs.

5. Segmenter

Schematics are used to convey some geospatial concept (such as 'how to get from A to B' or 'where is Z') to a user. The task typically requires more than one schematic, so a route may be presented as a sequence of schematics with a next/previous operation. Generally speaking, the geospatial concept to be conveyed is segmented into individual schematics so that each schematic contains something meaningful in the real world, for example that section of a road between two significant junctions.

This can be contrasted with conventional maps that are split onto several pages, for example in a book (such as an "A-Z"), where the pages are a fixed size with a fixed overlap irrespective of what they are showing.

In the present routing application example, once the route has been identified (and optionally geometrically simplified) and POIs have been selected, the entire route is segmented into individually displayable sections.

The segmentation of the route is driven by the system's model of the real world, the aim being to break the route up into parts which individually make sense and can be easily related to one another.

Different segmentation methods are provided depending on the schematic generation method used. Several schematic generation methods will be discussed later.

5.1 Route Segmentation Based on Significant Junctions

In a first method, segmentation is achieved by identifying significant junctions along the route. A significant junction can arise from a variety of significant events. For example significant events include the route changing from one road to another (as determined by the name of the road) or crossing a more important road. These significant events most commonly occur at nodes in the network data. Much source network data contains information about the names and priorities of road segments (edges) in a network. In addition source data can include information about whether a road segment is part of a junction or a roundabout. Thus, a node along the route which could be expressed as 'Turn left off road X onto road Y' is significant, whereas 'Continue on road A past a turning on your left into road B' is probably not.

A significant junction may be represented by a node in the network data, or it may be an extended junction, in which case it is represented by a sequence of edges in the network data. Extended significant junctions are identified by looking for nodes along the route which are determined to be significant and then including adjacent edges which satisfy one or both of the following:

(a) the edge is short and the nodes at BOTH ends are 'significant', (b) the edge is classified as being 'part of a junction/roundabout . . . ' in the source data.

5.1.2 Route Sections

The route is initially split up into 'route sections' by finding those sequences of segments between significant junctions. A route section will include the whole of the significant junctions (if extended) that bound it. Thus consecutive route sections will overlap at extended significant junctions. Consider a route consisting of three junctions: j1, j2 and j3, in which junctions j1 and j3 are simple and j2 is an extended junction. This leads to two route sections; 'j1 to end of j2' and 'start of j2 to j3'. These two route sections overlap because they both contain all of j2.

Complexity of the paths between significant junctions may necessitate further segmentation to improve clarity. Sections are further divided up in order to satisfy further criteria such as maximum number of spurs (insignificant junctions) in a section or maximum length of a section. This is done by recursive subdivision.

For example, the route, may be split into three sections as shown in FIG. 6.

5.1.3 User Interaction

User interaction may also affect segmentation, as follows. By default, a schematic 'leg view' would display one route section. The scale of the image will be chosen to fit the route section plus some overlap with the previous and next route sections, and any POIs associated with that section.

Therefore a single route section would typically correspond to a 'leg view'. However, the user may interactively choose to switch between leg views and junction views as he or she progresses along the route. If they switch between a junction view of a junction internal to an existing route section (say they switched from a junction view of the two spurs inside the first section in the example), the system may adjust the route sectioning accordingly in order to show a leg view which begins at the current user position. This is simply one example of how user action may affect route sectioning.

5.1.4 Processing

The generation, geometrical simplification, POI selection and route segmentation steps are performed once at the start of a routing session when the routing request is first received. The generation of individual schematics is performed on-the-fly when a route update is requested by the user, and is typically (depending on the number of route segments) performed repeatedly for each route segment.

5.2 Segmentation Based on Simplified Junctions

In an alternative method in which the simplified junction schematic generator (described below) is used to generate the route schematics, the segmenter works in the following way.

The segmenter selects the first node on the route and passes it to the simplified junction schematic generator as the seed node. From this seed node, the simplified junction schematic generator identifies a set of one or more nodes which are to be displayed as an extended junction in a single schematic.

The resulting extended junction displayed in a schematic may contain more than one node from the route. Therefore, once the schematic generator has generated the first schematic, the segmenter searches along the route to find the next node which has not yet been included in a schematic. This node is once again passed to the schematic generation module to become the starting point for the generation of the following schematic.

The segmentation of the route into different schematics is therefore achieved implicitly, as a by-product of the schematic generator's identification of extended junctions.

The segmenter may optionally identify only certain significant junctions for which schematics are to be generated, whilst other junctions are considered insignificant and are ignored.

In the case of the node imager schematic generator described below, a simpler segmentation method is also employed, as will be described below.

6 Schematic Generator

In a preferred embodiment, the system comprises several alternative schematic generator modules implementing different schematic generation methods. An appropriate schematic generation module is selected depending on the nature of the routing request. For example different types of schematics may be generated for different types of mobile devices depending on characteristics such as screen resolution. Also, the selection may depend on how the system is configured or may be user configurable. Furthermore, instead of or in addition to generating individual routing schematics the routing application may request generation of an overview schematic representing the entire route.

Embodiments may incorporate some or all of the schematic generators described, and may incorporate other schematic generators implementing different schematic generation methods having some or all of the features of the generators described in any suitable combination. Furthermore, different schematic generation methods may be implemented by a single configurable schematics generation module.

The following examples of schematic generators will now be described:

Path schematics generator:
Node Imager
Simplified junction schematic generator

Each schematic generator comprises a POI placement and labelling module which places POIs selected by the POI selector on the schematic and labels the features of the schematic. Similar techniques are used by the different schematics generators to do this. These techniques will be described following the description of the individual schematic generators.

6.1 Path Schematics Generator

The path schematics generator is typically used to generate schematics for use on large mobile devices. These may be overview schematics of the entire route or leg views showing a leg of the route covering several functions.

It can also be used on smaller devices to display views of a particular junction.

The operation of a path schematics generator 540 in the context of the routing subsystem will now be described with reference to FIG. 18*b*.

The network route structure generated as described previously is geometrically simplified by a Path Extraction module 542. The operation of this module will now be described with reference to FIGS. 7 and 8.

The network elements are first condensed into a set of paths, each path being a series of connected route edges sharing the same road name, each forming a simple string of edges. Thus for example in FIG. 7, a first path may comprise elements 20, 23 and 25, a second path may comprise elements 21 and 22, and a third path may comprise elements 24 and 26.

Each path is then individually simplified. This process involves removing details from, and otherwise manipulating the 2D polyline representation of the path.

For example, road sections that lie within a certain tolerance of being straight are straightened.

Distance tolerance considerations are taken into account as follows. A path is originally defined by a polyline containing a set of coordinates specified by the source data. This polyline is simplified by removing coordinates whilst maintaining the constraint that the simplified polyline lies within a distance error 'd' from the original polyline. For an orientation or location schematic, for example, the value of 'd' is chosen based on the size of the area covered by the orientation schematic. For example it might be chosen as $1/10^{th}$ of the maximum extent of the area covered. In the case of a routing schematic, the distance 'd' may be based on the size of the whole route: for instance 'd' may be one tenth of the size of the whole route. In another example, the value of d may change to reflect the size of the individual path. Further enhancements may constrain the error in the direction of the simplified polyline compared to the direction of the original at the corresponding point. This would be an angular constraint similar to but looser than the one applied at significant junctions.

Particular care over angular tolerance is taken near 'significant junctions' (as defined above), since the relative angular separation of roads at a junction affects the user's confidence.

An example of simplification of the data of FIG. 7 is shown in FIG. 8. The first path has been straightened out and aligned up and down the page. Element 24 has been straightened out. The angular separation between elements 23 and 24 at node 27 has been maintained.

If some of the paths are above a threshold length, then a new virtual junction is introduced at their mid-point.

Figure 18A:
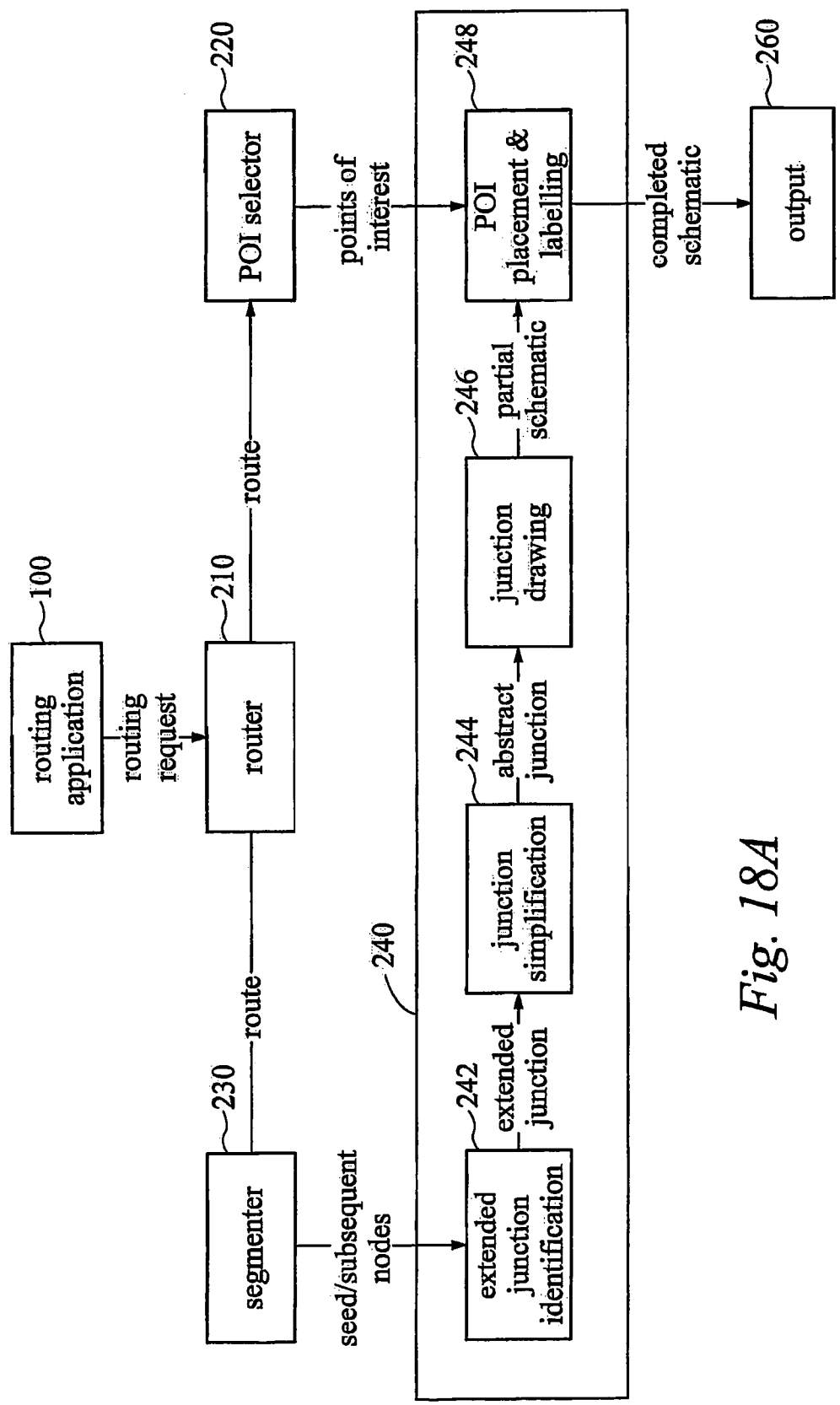
FIGS. 18*a*, 18*b* and 18*c* are schematics of different routing subsystems.
Figure 18B:
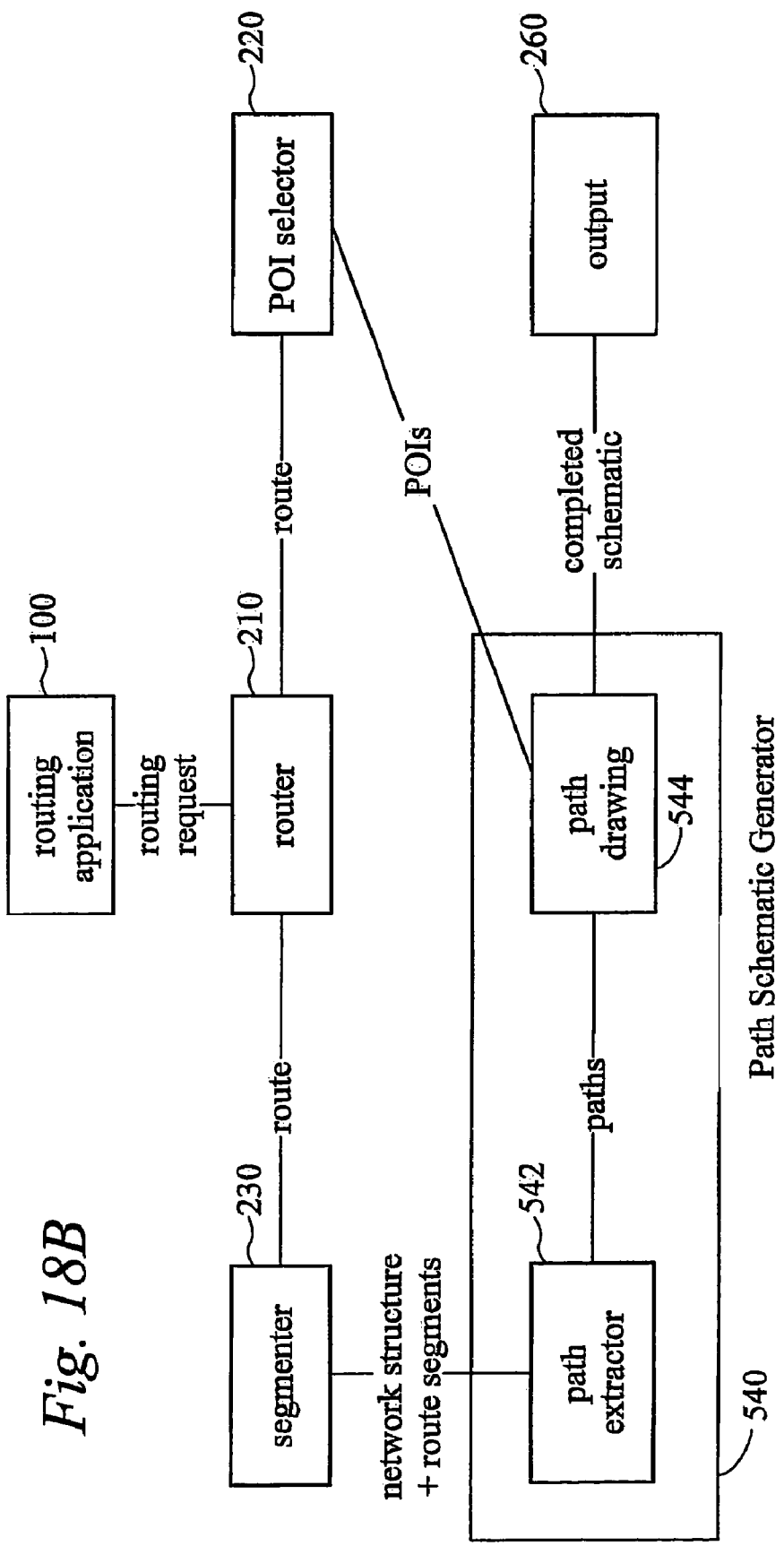

The simplified paths produced by the Path Extraction module 542 are used as input to the Path Drawing module (544 in FIG. 18*b*). This module is responsible for drawing the paths in an appropriate alignment on the screen and placing other decoration such as POIs and arrows. Its operation will now be described.

Geometries are arranged:
  to ensure that the alignment of the features on the screen makes best use of the screen's aspect ratio;
  if the destination has already been chosen, and the orientation schematic is being used as the first step in getting the user moving towards the destination, then the orientation schematic may be oriented to ensure that the user's current direction of movement is oriented up the screen (or alternatively left to right, depending on the screen format);
  if the orientation schematic is being used simply to identify the user's location, then the orientation schematic can either be oriented conventionally (i.e. north at the top), or alternatively, to ensure that some significant feature (e.g. the most important road currently in the orientation schematic) be aligned either up or across the screen;
  to align lines with the horizontal or vertical and to fit the most information into the smallest areas.

Each individual routing schematic (generated in response to a route update request received from the mobile device) is based upon a segment of the previously generated and geometrically simplified route, with which a number of POIs will have been associated by the POI selector. This 'segment' may include one or more nodes.

The choice of POIs actually displayed in any given routing schematic is further refined, as described below, and various techniques are employed to improve the clarity of the image, including the following:
  POIs are offset sufficiently from the roads to make them distinguishable if necessary.
  POIs, other icons (such as arrows) and spurs are moved up and down their associated paths to improve clarity without invalidating the fundamental information conveyed (for example, by keeping their relative position to each other consistent). Broadly, the algorithm looks at the classification of a road its size and whether it is a side road or a crossroads. Depending on the road's importance, it shows a stub or may show more geometry.
  if it is not possible to display all display items without introducing conflicts, items are removed according to a relevancy assessment which takes into account their proximity to the user and any scoring statistics calculated during their original construction (see POI ratings above).
  Path lent or relative angles or even path segmentation may be adjusted in order to further optimise the clarity of the resulting image.
  More detail may be included in the first routing schematic to aid the user in correctly identifying their location with reference to the schematic.

Examples of schematics generated in this way are shown in FIGS. 9, 10, 11 and 12.

6.3 Node Imager

Figure 18C:
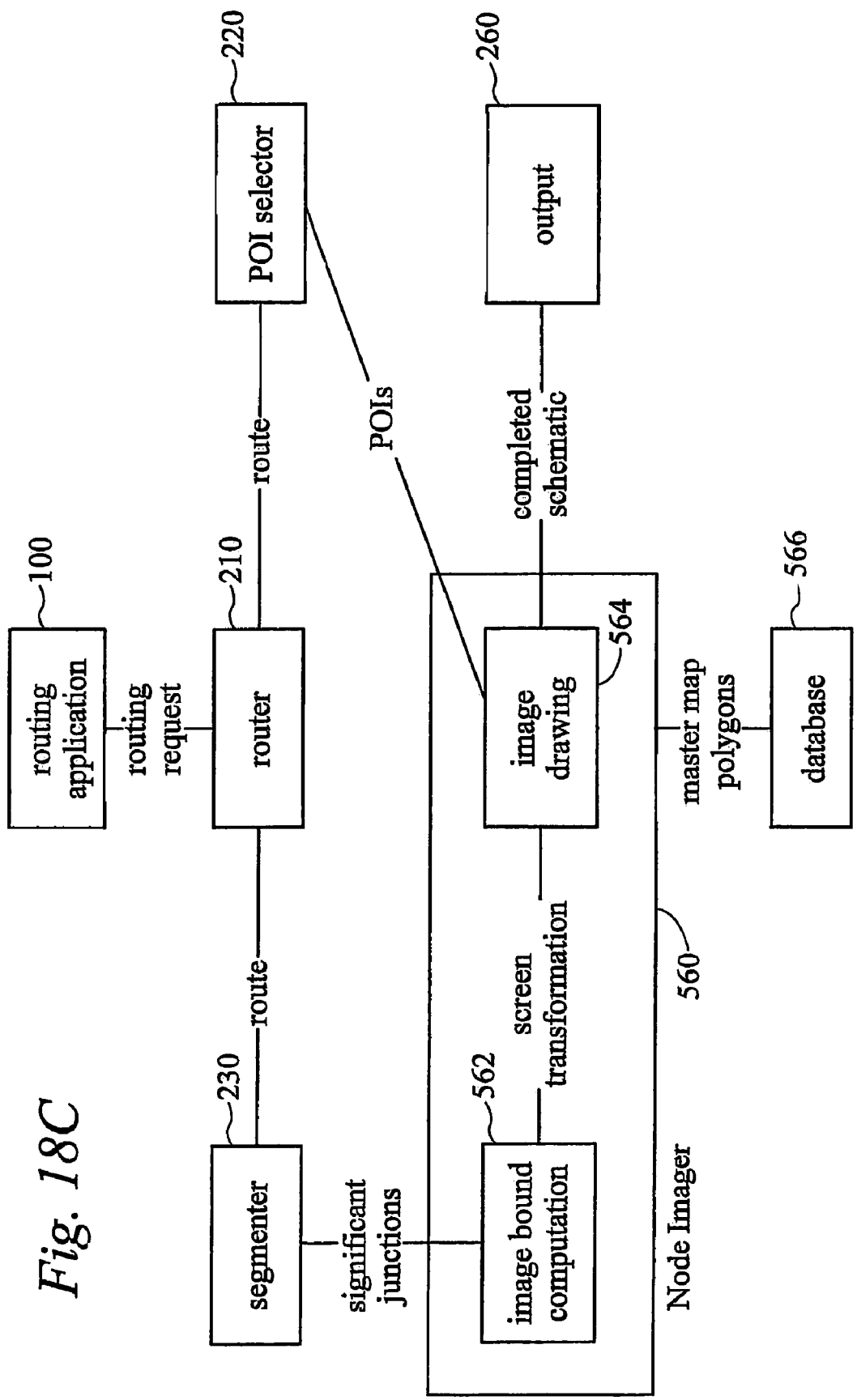

The operation of a node imager 560 will now be described with reference to FIG. 18*c*.

A node imager display is used to provide a junction-by-junction "bird's eye" view of a route. In some embodiments, the node imager 560 only provides junction schematics for significant junctions (such as FIG. 13) and omits all other junction schematics (such as FIG. 14). Showing the route junction-by-junction is more suitable for small devices where display of the legs of a route between junctions is impractical. The display from a node imager also differs from a schematic (of the types described above and below) in that it provides more detail of the junction and does not alter (that is to say simplify) the junction geometry. This provides enough detail to allow the user to be reassured that they are traversing the correct junction.

The input to the node imager 560 is the set of significant junctions computed by the route segmenter described previously.

The area to be displayed for each junction is calculated by the image bound computation module 562 as follows:
  the map is rotated so that the user arrives from the bottom (for portrait devices) and from the left (for landscape devices). For the initial image the map is rotated so the user leaves via the top (portrait) or via the right (landscape).
  the minimum bounding rectangle (MBR) in this rotated space, is determined for that part of the route that begins a specified distance along the route before the junction, the interior of the junction and a specified distance along the route after the junction.
  the MBR is extended to include those parts of the selected POIs which fall within the search radius of the junction (so that only part of the building outline may be shown).
  a scale and centre for the final image is chosen to maximise the scale at which the image can be displayed subject to showing the entire MBR.

The images are generated on the fly by the image drawing module 564 on a per-junction basis. They are generated by displaying the polygons associated with key features at the junction, specifically the roads and buildings. These polygons provide the necessary detail. Features that represent POIs are highlighted and labelled. Labelling of the image is undertaken as a final stage in the same manner as described below. The route is represented by an incoming arrow on a section of route before the junction and an arrow on a section of route after the junction. Thus these arrows are unambiguously associated with edges which are no part of the junction itself. This approach does not attempt to dictate to the user how to negotiate the junction, rather it leaves these details to the user 'on-the-street' where additional constraints may be visible.

Figure 13:
FIGS. 13 and 14 are exemplary schematics as generated by another embodiment of a schematic generator.
Figure 14:

FIGS. 13 and 14 are examples of schematics generated by the node imager.

6.4 Simplified Junction Schematic Generator

The aim of the simplified schematic generator is to produce a simplified, abstract representation which is suitable for display on small devices but which retains sufficient information so as to be representative of the real world as seen by an observer and user of the schematic.

A particular factor affecting the usability of a schematic-based route guidance application concerns the treatment of complex junctions. A road junction may be considered complex if it involves well-defined road artefacts such as roundabouts, dual carriageways or traffic islands or if the number or geometry of roads meeting in a small region makes it difficult to resolve the road network into single isolated nodes that a pedestrian would consider to be single junctions.

An example of a complex junction is shown in FIG. 15, which shows a map section covering a complex junction as supplied by Ordnance Survey in 'Master Map' format.

The map represents the real-world geometry of the road network that constitutes the complex junction, as well as the buildings present in the area, which are shown in outline. What appears to be a triangular traffic island can be seen at the centre of the image. As a whole, the map provides a realistic representation of the real world.

A pedestrian might perceive a complex road network, such as the road network of FIG. 15, in many different ways, depending on how they approach the junction(s), where the pavements are, whether it is possible to traverse the traffic island on foot, or on more personal preferences. Examples of how a human might typically represent this complex junction in a hand-drawn sketch map are given in FIGS. 16A, 16B and 16C, though naturally, many other ways of drawing the junction in an abstract way are possible.

The road network data provided by geographical data suppliers is typically oriented towards how a road user would perceive and navigate this junction.

FIG. 17 shows the data provided by TeleAtlas for the same complex junction. Some data suppliers supply further information on the road network in the form of other property flags on the roads. In this particular case, the road elements displayed in bold are flagged as "dual carriageway". The lighter road element is flagged as being "part of a junction". Nodes in the network are labelled A to G. The node G has been artificially inserted by TeleAtlas into the data to indicate the corresponding point on the other side of the dual carriageway to the node B.

A simple approach to junction schematic generation for a pedestrian route traversing this network might treat each node as a junction. For example, for a route entering at node C and leaving at F each of the nodes C, G, E, F may be displayed as junctions in turn and in isolation. This could lead to much user confusion since it might appear that the route meets a fork at C, continues straight on at G, joins another road at E and then forks again at F.

Generating a schematic which is simplified but representative of the real world from the available data involves the following steps:

- identifying which parts of the road network resolve into individual junctions as would be perceived by a pedestrian. Such junctions correspond to sets of road network elements and are termed 'extended junctions'.
- Generating a simplified representation of each extended junction
- Generating a schematic depicting the simplified extended junction along with context information The simplified junction schematic generator carries out the above steps in order to produce a simplified, abstract representation of a junction. Its operation in the context the routing subsystem will now be described with reference to FIG. 18a.

Routing application 100 supplies a route request to the routing subsystem 200, specifically to router 210, which identifies the required route, as described above. The route is passed to segmenter 230, which provides successive seed nodes (for each route segment to be displayed) to simplified junction schematics generator 240. Schematics generator 240 generates a graphical schematic based on the received seed node and outputs this to output 260.

Schematics generator 240 comprises an extended junction identification module 242, a junction simplification module 244, a junction drawing module 246 and a POI placement and schematic labelling module 248.

Extended junction identification module 242 identifies an extended junction based on the seed node supplied by route segmenter 230. This is achieved by growing outwards from the node, adding road network elements to the set of network elements forming the extended junction if that road network element conforms to one of a number of junction criteria identifying it as belonging to part of a junction. In some cases, no network elements may be found which satisfy the junction criteria. In this case the extended junction identified will comprise only a single node namely the seed node. The extended junction identification module will be described in detail below.

Junction simplification module 244 creates an abstract representation of the extended junction identified by extended junction identification module 242. This abstract junction describes the extended junction as a point in the network, with multiple junction exits leaving it. These junction exits correspond to the road elements that meet at the nodes of the extended junction but which are themselves not part of the extended junction. The abstract junction is also simplified geometrically, with real-world angles being changed to angles more suitable for schematic display.

However, not all extended junctions can be reduced to a single point, since this could be misleading to a reader of the schematic. For example, where exits from an extended junction are essentially parallel but spaced apart (staggered exits), showing these exits leaving from a single point may lead to a confusing schematic. In such cases, an extended junction cannot simply be shown as a single point, and a more complex representation is needed.

The generation of a simplified, abstract junction representation will be described below.

Once the junction has been simplified, junction drawing module 246 creates the graphical representation of the simplified junction.

POI placement and labelling module 248 adds context information such as POIs and labels to the graphical representation of the simplified junction to produce the completed schematic.

6.4.1 Extended Junction Identification Module

Extended junction identification module 242 will now be described.

An extended junction comprises one or more nodes, te set of internal edges connecting those nodes if any, and a set of external edges leading to and from the extended junction.

Figure 21:
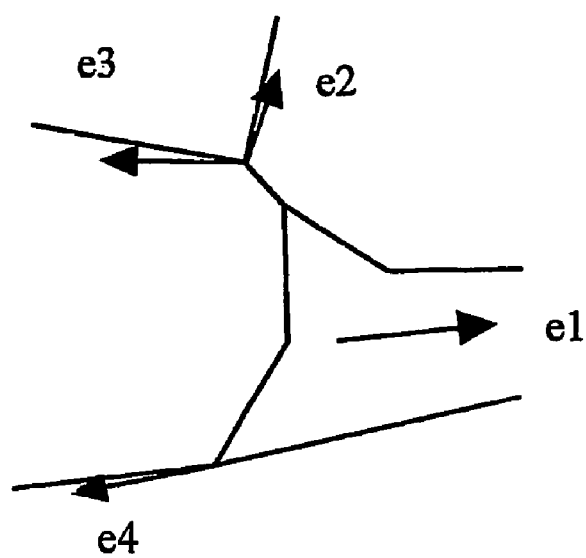
FIG. 21 illustrates the identification of an extended junction from the road network of FIG. 15.

A representation of an extended junction isolated from the road network data of FIG. 17 is shown in FIG. 21.

The extended junction is represented as a set of network elements comprising the set of junction nodes, the set of internal edges and the set of external edges.

The extended junction is isolated by growing a network of junction edges outward from the seed node, adding new edges to the extended junction that meet the junction criteria, until no more edges can be added.

In many cases the resulting network is the degenerate or trivial case of an extended junction, namely a single node. However, in some cases, the resulting network comprises a set of nodes and edges internal to the extended junction. This could include the case of one node and one edge, although this is rare. More typically the non-trivial case includes two or more nodes and one or more edges.

Beginning with the seed node, all connecting edges are added to a set of unexplored edges. Then, each unexplored edge in the set is examined in turn to determine whether it meets any one of a set of junction criteria. If the edge meets one of the criteria, it is considered to be part of the extended junction. The edge is then removed from the set of unexplored edges and added to a set of internal junction edges. These internal junction edges are edges that are part of the extended junction.

The node at the other end of the junction edge thus found is added to a set of unexplored nodes for further consideration.

If the edge being considered does not meet the criteria, then it is considered to be an external edge, meaning that it corresponds to a road segment leading into or out of the extended junction.

Once all edges connecting to the seed node have been considered in this way, processing continues with the next unexplored node and its connecting edges are considered for inclusion in the extended junction. The algorithm terminates when the set of unexplored nodes is empty, meaning that no further edges can be added to the extended junction. Throughout the process, edges which do not satisfy the junction criteria are considered not to form part of the extended junction and are therefore identified as external edges.

The algorithm is summarised in the following pseudo-code, in which:

UnexploredNodes is the working set of nodes to be considered for inclusion in the extended junction JunctionNodes is the set of nodes forming part of the extended junction JunctionEdges is the set of edges forming part of (i.e. internal to) the extended junction MeetsJunctionCriteria (edge e) is a boolean function which applies the junction criteria to the edge e and returns true if any of the criteria are met and false if not.

```
UnexploredNodes := {SeedNode}
JunctionNodes := { } ; JunctionEdges := { }; ExternalEdges := { }
While UnexploredNodes is not empty {
    Remove next node n from UnexploredNodes
    Add n to JunctionNodes
    For each edge e adjacent to n not already in JunctionEdges {
        If MeetsJunctionCriteria (e) then
            add e to JunctionEdges
            add node at other end of e to UnexploredNodes
        else
            add e to ExternalEdges
        end if
    }
}
```

Junction Criteria

The criteria applied to determine whether a network edge should be taken to be part of an extended junction will now be described.

Criterion (1). Flags set in the source data. The source data comprises flags which indicate whether a certain road element is part of a junction. In the example of FIG. 17, the element from A to E is flagged as being part of a junction by TeleAtlas. A road element flagged as being part of a roundabout also satisfies this criterion.

Criterion (2). Length of the network element. If the road element is shorter than a certain threshold length (for example, 20 m) then it is considered to be part of a junction. In some embodiments, different thresholds may be applied depending on the road classification size or width of the road element.

In the example of FIG. 17, the element E to F may well satisfy this criterion.

Criterion (3). Dualness of the network element. If a network element is flagged in the source data as being the other side of a dual carriageway to another element that has already been identified as belonging to an extended junction, then it will also be added to the extended junction. In the example of FIG. 17, if the element from A to B is added to the extended junction, then so will its dual, E to G. This duality pairing is derived from the source data.

Criterion (4). Elements of traffic islands. Road elements surrounding traffic islands are considered to be part of an extended junction. If (as, for example, is the case for the TeleAtlas data), the property of being adjacent to or part of a traffic island is not flagged in the road network source data, it is possible to identify algorithmically the likelihood that a given set of network elements form part of a traffic island from the network data that is available.

A traffic island is detected if the road elements correspond to a particular configuration.

Figure 19:
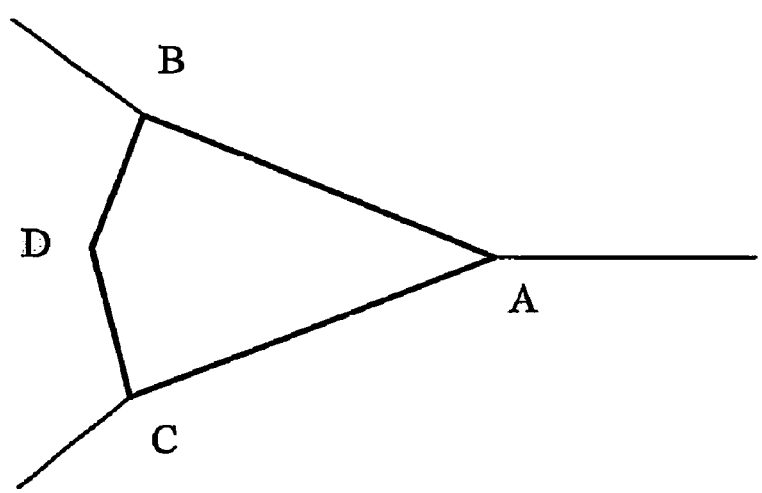
FIG. 19 illustrates the typical road network configuration of a traffic island.

This configuration is illustrated in FIG. 19. Specifically, a traffic island is detected where a set of network elements is found that comprises two sides (AB, AC) emanating from a node (A), and joined by no more than two edges (BD, DC or simply BC); and that further satisfies the following rules:

All roads at node A must have the same (or no) name. There may be more edges at A than depicted in FIG. 19 as long as they satisfy this rule.

B and C must be connected by at most 2 road elements, i.e. the node D may or may not exist. If there are two road elements, they must have the same name. There are some allowable exceptions to this rule:

B and C need not be connected if instead they are adjacent to two paired elements of the same dual carriageway; this would correspond to the case of a road splitting into two at a traffic island.

BD and DC need not have the same name if they are flagged as part of a roundabout or junction.

BD and DC need not have the same name if one is very short (less than 3 m).

AC and AB must be shorter than a specified length (for example, 75 m).

There must be no (MasterMap) buildings inside the region defined by ABDC. This last rule is applied as a verification check.

If the network satisfies these rules, then it is considered to constitute a traffic island. All of the bold elements AB, BD, DC and AC are considered to be part of the same extended junction.

An algorithm suitable for identifying whether a given edge is part of a traffic island having the above characteristics will now be described.

To be considered part of a traffic island, a given edge must be part of a network structure matching the pattern described above. The edge itself must therefore correspond to one of the edges AB, AC, BD, and DC, or, in a simpler arrangement, must correspond to an edge BC.

Furthermore, the requirements described above dictate that the edge in question must either be an AB or AC-type edge, or adjacent to such, an edge. In fact, since the pattern is symmetric, an AB type edge is equivalent to an AC type edge with respect to the requirements, and a BD type edge is equivalent to a DC type edge. It is therefore only necessary to consider whether the edge in question is an edge of type AB or is adjacent to an edge of type AB.

The problem of whether a given edge is part of a traffic island can hence be solved by determining whether either the edge in question or another edge adjacent to it is an AB type edge within a traffic island pattern of edges, and, in the event that an adjacent edge is such an AB type edge, whether the given edge is part of that pattern.

To achieve this, a set of directed edges is first constructed containing a) the given edge itself in both directions (e.g. XY and YX);

b) all edges adjacent to the given edge, in both directions;

Each directed edge in the set is then tested to see if it is an AB type edge. This is done by attempting to construct a network around the edge corresponding to the pattern assuming that the edge is an AB type edge. If it is not possible to construct such a network, then the edge is not an AB type edge. If it is possible to construct such a network, then the network constructed represents a traffic island in the sense defined above. If the traffic island contains the given edge, then processing stops, since it is then known that the given edge is indeed part of a traffic island, and so Criterion (4) is met. If not, testing continues on the remaining directed edges.

This algorithm is illustrated by the following pseudo-code.

```
FUNCTION Is_Part_Of_TrafficIsland (Edge) RETURNS boolean
    Generate set of Edge + all adjacent edges XY
    For each Directed_Edge in both directions XY and YX
        TrafficIsland := Identify_TrafficIsland (Directed_Edge)
        If TrafficIsland contains Edge THEN
            exit function returning "true"
        End if
    End for each
    No traffic island has been found which contains the edge, so exit
    function returning "false"
END FUNCTION
```

```
FUNCTION Identify_TrafficIsland (Directed_Edge AB) RETURNS set
of edges
    If AB longer than threshold
        it is not part of a traffic island - exit function returning an empty
        set of edges (meaning that no traffic island has been identified).
    Otherwise, identify each further edge AX leaving A having a
    different road name to AB. If there is one, exit.
    Otherwise, for each edge AX, check the following:
        Is AX shorter than the threshold length? If no, exit.
        Is there a path of length 1 (XB) or length 2 (XY,YB) from X to
        B? If no:
            Are AB and AX flagged as being two sides of the same
            dual carriage way? If no, exit.
        a potential traffic island has been found consisting of AB, AX and
        either XB or XY, YB.
        Check if line from midpoint(AB) to midpoint(AX) intersects
        building in Master Map data. If no, return traffic island.
END FUNCTION
```

Consider the network depicted in FIG. 17 for an illustration of how the extended junction criteria are applied.

Starting at node F, the only adjacent element to be part of an extended junction is EF, based on criterion (2), its length. The node E is then analysed. The element EA is part of the same junction due to criterion (1), being flagged in the data. Despite the fact that there is in reality a traffic island between them, EG and AB are not identified as being part of a traffic island (and hence are not part of the junction), due to the extra complexity introduced by the nodes B and G.

Therefore the extended junction comprises nodes F, E and A, and the road elements EF an EA. All the other roads meeting at these nodes are considered external to the extended junction.

7.4.2° Junction Simplification Module

The junction simplification module 244 will now be described.

The extended junction identified by the extended junction identification module defines the road network content of the schematic to be generated. A simplified, abstract representation of the extended junction is then generated by the junction simplification module for inclusion in the junction schematic.

In the example of FIG. 17, the extended junction comprising FEA has four exits; one to the North corresponding to the exit from F, two to the West corresponding to F and A, and one to the East corresponding to EG and AB.

The extended junction is defined by the set of nodes forming part of the junction, the network edges internal to the extended junction (i.e. edges connecting the junction nodes), and the network edges external to the extended junction, which are the edges leading into and away from the extended junction. These will be referred to as junction exits.

Where it is necessary to consider the position of an exit (for further stages in the algorithm defined later), this is taken to be the position of the node that the exit leaves from.

The extended junction notionally has a centre defined by the average position of the network nodes it comprises.

Figure 20A:
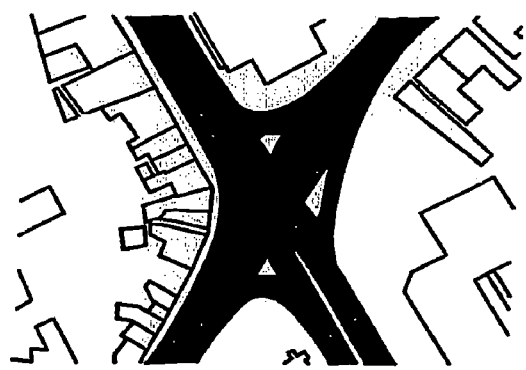
FIGS. 20A, 20B, and 20C show a map of a different road network, road network data for that network and a simplified representation of that network respectively.
Figure 20B:
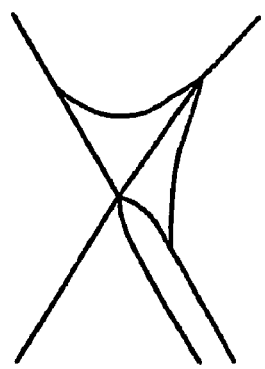

In the majority of cases (including the trivial one where the junction comprises a single node), an acceptable schematic image can be generated simply by drawing a diagram with a single road corresponding to each exit all leaving from the same point, namely the extended junction centre. An example of this is given in FIGS. 20A, 20B and 20C, in which FIG. 20A shows the MasterMap data for a complex junction, FIG. 20B shows the road network data (for example from TeleAtlas) corresponding to the same junction, and FIG. 20C shows a simplified schematic of the junction.

Figure 20C:
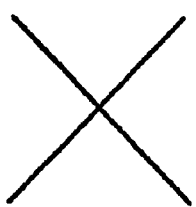

The benefit of conceptualising the junction as a point with various exits is that at the time the schematic is generated, the exact angles and line work displayed can be manipulated to give a more regular appearance, for example exits can be 'snapped' to being perpendicular or anti-parallel to each other within some tolerance, FIG. 20C.

In some cases however, it is not acceptable to draw all exits emanating from the same point. For example, in the complex junction shown in FIG. 17, there are two distinct but near-parallel exits leaving to the west. Another reason for not wanting to draw two exits at the same point is if the junction is obviously staggered.

In these cases, there are further steps to the schematic generation process. In order to minimise the complexity of the resulting schematic but still convey the true form of the junction, the junction simplification module attempts to find a grouping of the exits where each exit in a group can be displayed as emanating from the same point. Such groups are termed 'clumps' of junctions. Exits will only belong to the same clump if they can be displayed at the same point. The junction simplification algorithm attempts to minimise the number of clumps, and hence to maximise the number of exits belonging to each clump.

The junction simplification algorithm comprises the following steps:
  Defining the junction exits based on the external junction edges
  Grouping the junction exits into clumps
  Identifying alignment relationships between clumps
  Prioritising the alignment relationships Defining the Junction Exits The simplification algorithm first generates the set of junction exits based on the extended junction's external edges. Each junction exit has the following properties associated with it:
  The external edge corresponding to the exit
  The angle at which the external edge leaves the junction
  The position of the exit, which is taken to be the position of the junction node to which the external edge connects
  If two exits are part of the same dual carriageway, they are considered to be the same exit.

Since the external edge corresponding to an exit (which is a network edge from the geographical source data) is not necessarily straight, a representative angle is chosen. A variety of methods for determining the angle associated with an exit are available, of which the following are examples:

- by calculating the average angle of the polyline segments over a certain distance (for example, over 50 meters)
- by grouping the angles of the polyline segments over a certain distance into a number of distinct ranges, and selecting an angle based on the most frequently occurring range
- if the angle of a polyline segment exceeds a threshold (for example, 90 degrees), the remainder of the polyline may be ignored
- by calculating the angle of a straight line connecting the starting node to a point a certain distance along the polyline
- If the angle selected based on one of the previous methods would define an exit that would intersect a building (as given by the MasterMap data), this may correspond to a road bending around a building. In this case, a different angle can be selected.

In the case of a dual carriageway defined by a pair of edges flagged as such in the source data, the angle and position attributes are taken to be the respective averages of the edges' angles and starting positions.

Grouping Junction Exits into Clumps

Once the set of exits for an extended junction have been determined with their angle and position attributes, clumps of exits are identified. A clump of exits is a grouping of exits which can be drawn from the same point.

The first step in identifying clumps is to identify pairs of exits which cannot belong to the same clump. This could be either because they are near anti-parallel but sufficiently separated in position that they correspond to a 'staggered' pair of exits, or because they are sufficiently parallel that they cannot be displayed at the same point. The terms 'near' and 'sufficiently' in this context are determined by constant factors set by experimentation. Each exit in such a pair is put into its own, new clump.

All possible pairings of exits are exhaustively tested to determine if they are either parallel to within a given threshold angle, or anti-parallel to within a threshold angle and separated by a distance greater than a threshold distance.

The second step identifies exits that cannot belong to only one of the clumps made so far on the basis that if they were put into one of the clumps, this would destroy a 'near anti-parallel' relationship that the exit holds with an exit in another clump.

The third and final step in the clumping algorithm assigns exits not yet in clumps to the most appropriate existing clump. To do this, the exits are ordered 'clockwise' around the junction. This clockwise ordering is first done on the basis of the position of the exit around the centre of the extended junction. Exits which are at the same position are further ordered on the basis of the angle between each exit and the vector subtended from the centre of the junction to the position of the exits.

Exits are then assigned to the closest clump whilst ensuring that this ordering of the exits is preserved. The assignment algorithm considers the exits in their clockwise ordering in sequence. Starting with the first exit, this is assigned to the nearest clump. The algorithm continues around all exits in a clockwise direction, until all exits have been assigned.

EXAMPLE

Referring once again to the sample network data illustrated in FIG. 17, as an example of how the clumping algorithm works, consider an extended junction comprising nodes F, E and A.

FIG. 21 shows this extended junction with exits labelled. Since external junction edges EG and AB are flagged in the source data as being two sides of the same dual carriage way, these are identified as the same exit by the junction simplification module.

Therefore, FIG. 21 shows a total of 4 exits labeled e1, e2, e3 and e4.

In the first step of clump identification, the exits are considered to determine which exits need to be assigned to separate clumps. In the example, e3 and e4 are assigned to two separate clumps C1, and C2, since they are near parallel. At this stage, exits e1 and e2 are yet to be assigned to clumps.

In the second step, the remaining edges are considered. Exit e1 cannot belong to the clump c1 (so far containing e3) since it is near anti-parallel with e4 (in clump c2). By the same token it cannot belong to c1. Such exits are put into new, separate clumps; here exit e1 is put into a new clump C3.

Now that the clumps have been defined, the remaining exits are assigned to their respective nearest clump. Here exit e2 is assigned to clump C1.

Identifying Alignment Relationships between Clumps

Figure 22:
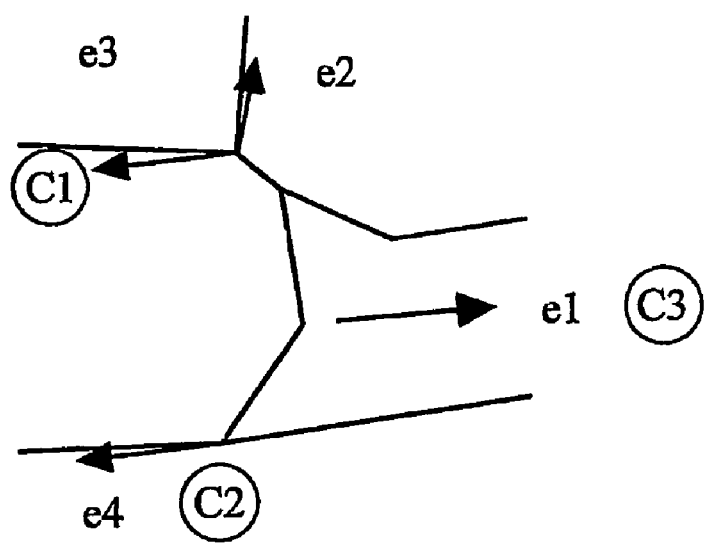
FIG. 22 illustrates the identification of clumps of exits.

The next stage in forming a schematic for the junction involves identifying the relationships between the clumps that relate to important visual structure of the junction as perceived by a user. These relationships will define how the clumps are positioned within the schematic. In the example of FIG. 22, the fact that e1 and e4 are near anti-parallel defines a relationship between C2 and C3; referring to the real-world geometry in FIG. 15 it is clear that most users would perceive these exits as belonging to the same road. The aim is to retain as many of these relationships as possible whilst minimising complexity of the schematic by using parallel and perpendicular angles and drawing horizontal and vertical lines wherever possible.

The set of these relationships is described by a matrix of alignments of each clump with respect to all the other clumps. This is referred to as the alignment matrix. An alignment is a vector which describes the 'best' relative position of one clump with respect to another according to the strengths of the relationships between each pair of exits in the two clumps involved. These relationships may either be parallel or anti-parallel alignments of the pair of exits.

A parallel relationship corresponds to the real-world situation of a pair of staggered exits. An anti-parallel relationship corresponds to the situation of two road segments connected to each other in what is substantially a straight line.

Therefore, if a near-parallel relationship between exits, then it may be possible (and advantageous) to draw these as: staggered parallel exits off the extended junction. An example of this is illustrated in FIG. 23A, showing the original relationship of two near-parallel exits, and FIG. 23C, showing a simplified representation of that relationship.

Likewise, if two exits have a relationship to each other that is close to anti-parallel then they can be drawn in a simplified way by straightening them and connecting them in a direct line. This is illustrated in FIG. 24A, showing two exits having a near-anti-parallel relationship, and in FIG. 24C, showing the corresponding simplified representation.

The strength of a relationship relates to how close the actual real-world geometry is to obeying the parallel or anti-parallel relationship. It is defined in terms of the perturbation that would be required to move the exits so that they could be drawn in a manner which completely satisfies the relationship.

In the case of an exit corresponding to a dual carriageway, the geometry of both sides of the road is taken into account. Further refinements may involve taking the road names into account, in order to increase the probability that a single road through the junction is displayed as a straight line. 'Importance' (i.e. dual carriageway, major road, minor road) of the roads may also be taken into account.

Calculation of the strength of a near-anti-parallel relationship is illustrated in FIG. 24B. Exits 422 and 424 (shown as arrows) are almost anti-parallel. To satisfy a fully anti-parallel relationship (corresponding to two road segments connected in a straight line), apart from adjusting the exits' angles, one of the exits would need to be moved by a certain distance (the perturbation). The perturbation vector 430 describes this shift required to satisfy the relationship.

Calculation of the strength of a near-parallel relationship is illustrated in FIG. 23B. Here, exits 402 and 404 are almost parallel (corresponding to staggered exits). Perturbation vector 410 describes the shift required to draw the exits as staggered exits perpendicular to a straight connecting road-segment.

In either case, the strength of a relationship is anti-proportional to the length of the perturbation vector, that is to say, the shorter the perturbation vector is, the stronger is the relationship.

In some embodiments, in addition to the length of the perturbation vector, the perturbation angle (shown as $\alpha$ in both FIGS. 23B and 24B) is also taken into account in determining the strength of a relationship.

To determine the relative placement of two clumps of exits, the strongest relationship between any pair of the clumps' exits is identified.

For each pair of clumps an entry is created in the alignment matrix describing the strongest relationship between any exit in the first clump and any exit in the second clump.

Anti-parallel relationships correspond to two exits entering and leaving either side of the extended junction in what an observer may typically perceive as an essentially straight-line connection, and it is hence assumed that such relationships have greater significance for the observer than parallel, staggered-exit type relationships.

The junction simplification algorithm therefore searches for the strongest anti-parallel relationship first, and selects this as the strongest relationship between the two clumps under consideration. If no anti-parallel relationships can be found, then the strongest parallel relationship is the strongest relationship between the clumps.

This relationship is entered in the alignment matrix and becomes the alignment constraint for the given pair of clumps. If neither parallel nor anti-parallel relationships exist between any of the exits of the two clumps, the corresponding entry in the alignment matrix is left empty, essentially leaving the relationship between the two clumps undefined.

This algorithm may be summarised as follows:

---

For each pair of clumps <C1, C2>
   Find strongest anti-parallel relationship of all pairs <e1 ∈ C1, e2 ∈ C2>
   If none found:
      find strongest parallel relationship of all pairs <e1 ∈ C1, e2 ∈ C2>
   Enter strongest relationship found into alignment matrix for C1, C2,
   or leave blank if none found

---

In the case of a dual carriageway, both road segments are considered. The strongest relationship between an exit representing a dual carriageway and another exit will therefore always be the stronger of the two relationships between either side of the dual carriageway and the other exit.

In the example of FIG. 22, there is an anti-parallel relationship between e1 and e4. This relationship is very strong since the south side of the road defining e1 and the road defining e4 are very nearly parallel. There is also an anti-parallel relationship between e1 and e3, although this is not as strong as that between e1 and e3. The entry in the alignment matrix describing the best alignment of C2 with respect to C3 is a vector parallel to the average of the direction of e4 and e1.

Considering the clumps C2 and C1, there is a parallel relationship between e3 and e4, and a perpendicular relationship between e2 and e4. In this case, the parallel relationship is this stronger due to the actual angles and positions involved. In actual fact these two relationships are not mutually exclusive since it is possible to draw a diagram where both are satisfied. The entry in the alignment matrix describing the best alignment of C1 with respect to C2 is a vector perpendicular to the parallel relationship defined by the average of the directions of e3 and e4.

The alignment matrix is filled with these vectors describing the best relative positions of the clumps. Sometimes two clumps will have no particular good alignment, in which case the relevant entry in the matrix will be empty. In mathematical terms, the matrix is an upper-diagonal matrix describing constraints on the relative positions of the various clumps.

The alignment matrix defines the strongest relationships between every pairing of clumps in terms of an alignment vector and the strength of the relationship. As previously stated, the strength is given by the perturbation necessary to shift one exit (relatively to the other) into the required position. The alignment vector gives the angle and length of a line connecting the two exits once so shifted.

Prioritising the Alignment Relationships

In order to draw an optimal schematic, the junction simplification algorithm searches for a positioning of the clumps which best satisfies the constraints specified by the alignment matrix. In general, it will not be possible to satisfy them all or there may be some positions which are no better than others—in other words, the system may be over- or under-constrained.

The junction simplification algorithm first identifies the strongest constraint in the matrix (that which would require the least perturbation of the network in order to be satisfied) and fix the relative positions of the two clumps involved. This constraint is added as the first entry to an ordered list of constraints, and the corresponding matrix entry is removed.

The relationships between the remaining unfixed clumps and each other and the already fixed clumps are then assessed by searching the remaining non-empty entries in the matrix. The strongest remaining constraint defines the position of another clump and the fixed ones or a non-fixed one. This constraint is added to the ordered list (in second place), and its entry is again removed from the alignment matrix. This process is repeated until there are no constraints left in the alignment matrix. Arbitrary constraints between the remaining unfixed clumps (if any) are then invented on the basis of their actual relative position.

Other known optimisation techniques can also be used to identify an arrangement of clumps that best satisfies the constraints specified by the alignment matrix.

The ordered list of constraints thus obtained defines a priority ordering on the constraints.

This provides a plan for drawing the schematic. In the example of FIGS. 21 and 22, the resulting plan is to draw C3 relative to C2 in a direction defined by e1 and e4, and C1 relative to C2 in a direction perpendicular to e2 and e3. This plan is provided as input to the junction drawing module 246.

Although it is conceivable that the above algorithm may result in schematics which involve intersecting junctions or otherwise inaccurate representations, it has been found in practice to result in satisfactory solutions.

6.4.3 Junction Drawing Module

The junction drawing module 246 will now be described.

Once the plan for drawing the extended junction has been generated by the junction simplification module, the schematic can be drawn.

The constraints defined by the plan are processed in turn. One clump involved in the first constraint is fixed arbitrarily (for example, to the centre of the drawing area). The other clump involved in the constraint is then drawn at a fixed distance to the first clump at the angle described by the constraint after having been 'snapped' to an aesthetic value (such as horizontal, vertical or 45 degrees if possible). In the case of three or fewer clumps in total, this fixed distance is computed on the basis of screen size and the actual length of the constraint is ignored. If there are four or more clumps, the distances between the clumps are based proportionally on the screen size and the length of the constraint (which will correspond roughly to the original distance in the real world). This behaviour for four or more junctions is necessary for extremely complicated junctions since the extra simplification introduced by ignoring the lengths can destroy the structure of the junction.

The location of all clumps thus fixed defines where the exits belonging to each clump are drawn. The angles of the exits are snapped to preferred values (for example to units of 22.5 degrees or 45 degrees). No internal structure is show for the extended junction.

Figure 25:
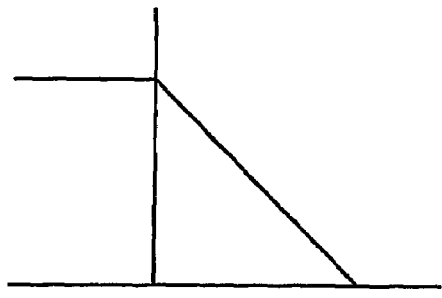
FIG. 25 shows an abstract representation of the road network of FIG. 15 as generated by the schematic generator.
Figure 26:
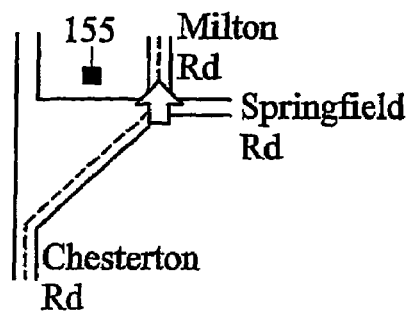
FIG. 26 shows a corresponding schematic generated by the schematic generator.

An example of the abstract junction representation derived by the junction simplification module representing the extended junction of FIG. 21 is depicted in FIG. 25. The resulting schematic is shown in FIG. 26. The extended junction itself is simply represented by a triangular shape of at the centre of the schematic, with road stubs representing junction exits leading off it. All angles and lines are horizontal and vertical or at 45 degrees and line lengths are equal yet the perceived structure of the junction has been preserved.

The length of road stubs is selected based on the road classification and on whether the junction exit in question is on the route. The possible lengths are fixed for each type of mobile device/resolution, such that the desired emphasis is achieved, for example displaying longer road stubs for exits which are part of the route than for exits that are not.

The schematic is also oriented such that the route enters the schematic vertically from the bottom of the screen.

The above discussion concentrated on an extended junction representing a complex real-world junction. The steps involved in the case of a roundabout are the same until the clump alignment matrix is constructed. Exits from a roundabout are still resolved into clumps, but the plan for positioning the clumps on the schematic is constructed by describing the position of the clump relative to the centre of the (circular) roundabout.

Leg Views

The simplified junction schematic generator is particularly suitable for generating schematics for display on small or medium-sized mobile devices. However, the same junction simplification method may be used to produce schematics of larger route sections corresponding, for example, to a leg of a journey. Such schematics are suited for display on a large mobile device.

Figure 27A:
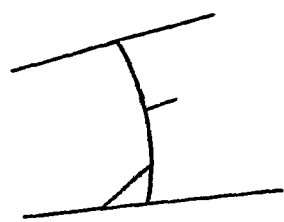
FIGS. 27A, 27B, 28A, 28B and 28C illustrate methods of displaying more than one simplified junction in a single schematic.
Figure 27B:
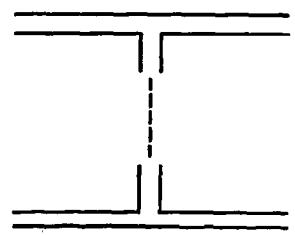

Such a leg view typically represents several junctions in the same schematic by chaining together schematics for individual extended junctions with straight or dotted lines, as exemplified in FIG. 27, which is a schematic representation of the real-world network shown in FIG. 27A.

Figure 28A:
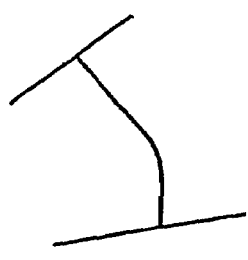
Figure 28B:
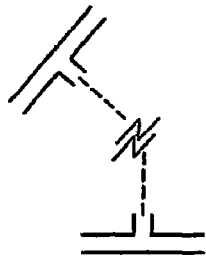
Figure 28C:
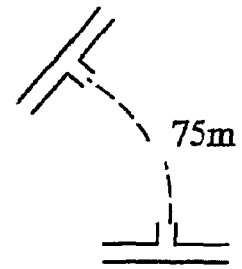

The distance separating the junctions in the schematics need not reflect the real world at all; the pertinent information to the user is how to navigate the junctions. Actual distances in the display are chosen to fit the phone screen appropriately. Road network nodes in between junctions at which the user needs to change direction (make a turn) may be considered insignificant and ignored completely, as has happened in FIG. 27B. If the road turns significantly in the real world, the schematics are chained together using a kinked line or a curve. The fact that the separation of the junctions on the screen may not reflect distances in the real world can be conveyed using conventional map symbols. These ideas are illustrated in FIGS. 28A, 28B and 28C.

6.4.4 POI Placement and Labelling

The POI placement and labelling module adds context and label information to the schematic.

Points of interest will have been previously identified by the POI selector for the entire route, and each point of interest selected will have been associated with a particular node along the route.

In the case of a schematic generated by the simplified junction schematic generator, all points of interest associated with the extended junction nodes which lie on the route are considered for inclusion kin the schematic. Points of interest which are located near nodes or road segments not on the route will generally not have been selected by the POI selector and are therefore not considered.

Points of interest are displayed on the schematic in one of several different ways, depending on the type of schematic and other constraints (such as screen size):

As a point

As a building outline or shape

As an abstracted frontage

POI Display as a Point

This is typically used for small displays, or to avoid clutter where several POIs are displayed on path schematics.

FIGS. 9 to 12 are examples of schematics in which points of interest are displayed as points.

POI Display as a Building Outline or Shape

An example of this has been described above for the node imager, where POIs are shown as shaded building outlines.

POI Display as Abstracted Frontage

In this mode, an abstract representation of the frontage as visible from the street is generated.

The following properties of a POI near a junction are considered when displaying points of interest in this way:

1) Whether the POI can be seen at all from a given road

2) How large the POI appears to be from a given road. This is classified as one of:

a) Small b) Medium c) Large

3) How close the POI is to the junction. This is classified as one of a) At the junction b) Near the junction c) Not near the junction Other properties of the POI, such its shape, area distance from the road are considered less important. The property of whether the POI can be seen from a given road is particularly important in the case of private houses, since if these are simply labelled as the number part of their address then it is important to indicate which road this address lies on.

When a POI is to be displayed in the context of a junction schematic, the above properties are calculated for the POI with respect to the two exits that enclose it at the junction. These two exits are those to the left and to the right of the junction when viewed from the centre of the junction. The properties are calculated using the Ordnance Survey MasterMap geometry of the building.

1) is calculated by determining whether a line drawn from the closest point on the geometry building to the road to this closest point on the road intersects with any other buildings.
2) is calculated by projecting the geometry of the POI onto the road and measuring the length of this projection.
3) is calculated by projecting the geometry of the POI onto the road and measuring the distance from this projection to the junction.

Once these properties of the POI have been calculated, they provide an abstract description of the POI and the true geometry of the POI is discarded.

To display this information, it is possible to draw the frontage of the POI along each of the roads from which it is visible. The fact that the display only represents this frontage rather than the actual two-dimensional shape of the building is indicated to the user using appropriate line styles.

Figure 29B:
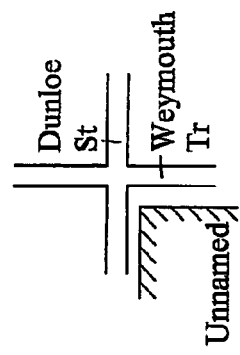
FIGS. 29A, 29B, 30A and 30B illustrate a method of providing an abstract representation of a point of interest in a schematic.
Figure 29A:
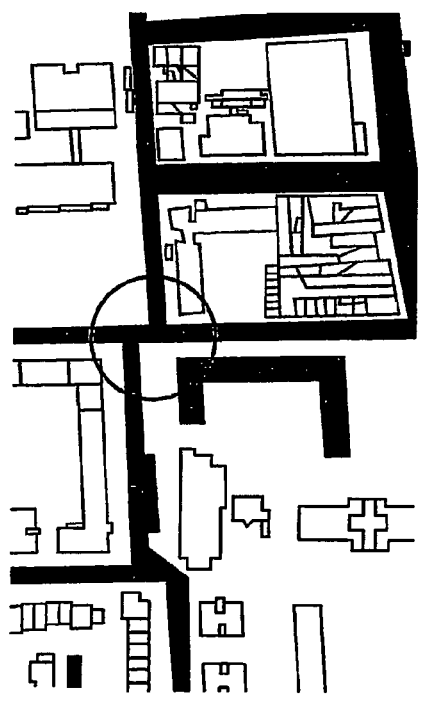

An example is shown in FIGS. 29A and 29B. FIG. 29A shows the Ordnance Survey MasterMap data for a given junction. A building selected for display as a POI is shown shaded. FIG. 29B shows a simplified junction schematic of the junction, with the abstract representation of the POI displayed, indicating the frontage of the building.

In FIG. 29B, the junction has been simplified to an exact crossroads. Although the building is longer in one direction than it is in the other, this is not relevant to a user at the junction; its property is 2c) (large) with respect to both roads. Similarly, the fact that it is further from one road than another is not relevant. The POI is at the corner of the junction and can be seen from either road.

Figure 30B:
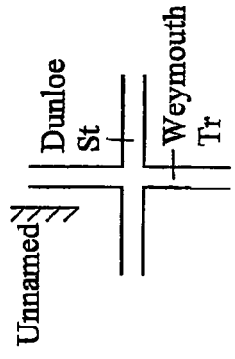
Figure 30A:
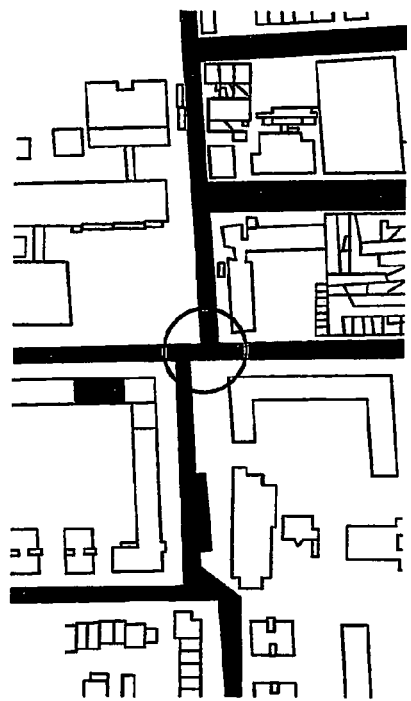

FIGS. 30A and 30B show a similar example for a different POI at the same junction.

In this case, the POI is only visible from one road. Its frontage along this road has been classified as being of medium length. A user approaching the junction along any other road (from either direction) will immediately understand that he may not be able to see the POI until he reaches the junction.

The styling, lengths and offset from the road of the POI display on the schematic are all set based on the mobile device type and screen resolution to optimise the space used and the aesthetic appearance of the display and are not affected by the real world geometry of the POI, save that there are different values used for the abstract properties 2 a) b) or c) and 3 a) b) or c) of the POI described previously.

This technique of resolving the POI into an abstract frontage along two roads (or in the terminology of extended junctions used above, two junction exits) allows for much flexibility when determining the visual display of the schematic; the exits may be positioned or rotated by the junction display algorithms yet the POI display will remain consistent.

6.5 Location Schematics

A variation of the simplified junction schematic generator described above can be used to generate schematics representing an overview of a location (rather than a route segment). Such a location schematic can be used to provide general information about a location, or can be used as an orientation schematic to allow a user to determine their location to greater accuracy within a known area, typically provided by a network location fix.

In order to provide pertinent information to the user within the restrictions imposed by the limitations of mobile device display technology, the location or orientation schematic presents a simplified view of the user's location. Such simplifications include the removal of less relevant information and straightening curved roads within certain tolerances, although the angular interrelationship between roads at junctions is generally preserved.

All the network nodes within the known area are identified by a spatial search.

These nodes are then fed to the extended junction identification module. The output of this module is a set of extended junctions each of which contain a set of one or more of the original nodes; the extended junctions describe a grouping of the network nodes.

These extended junctions are then simplified by the junction simplification module 244 and can be drawn by the junction drawing module 246. POIs may be displayed in the context of each of the extended junctions by the POI placement and labelling module 248 or treated as separated entities to be displayed on the schematic in their own right.

The stylised network in the orientation schematic is based on the junctions identified above together with those (parts of) non-junction network elements that fall into the location-fix area.

The location or orientation schematic thus covers the entire area of the location fix. It presents a stylised image based on network data as described above along with a selection of POIs and other context information.

For instance, the orientation schematic could represent multiple exits from a large building or other structure/area (e.g. office block, tube station, car park). In the case of exits that do not lie at actual road junctions, a 'virtual junction' is created at the exit. A virtual junction is any point that is not considered to be a road junction by the underlying network data, but is treated as a junction by the routing application for the purposes of determining a route or guiding the user.

Off Route POIs

The POI ranking scheme described above may be augmented so that, when displaying a route using POIs, off route 'hints' or 'signposts' to locations of interest can be displayed. An example of such a signpost may read 'British Museum 200 m this way'. The signposts could indicate something that a user has expressed an interest in (e.g. favourite coffee shop, a tourist passing something in their MyPlaces list), or something that a service provider wishes to attract to the user's attention (e.g. advertising).

This could involve showing icons having well-known symbols, for example, the McDonald's "M" or the London Underground logo; or a cross symbol for churches.

Labelling

Once a schematic has been assembled, the image is labelled. The number of features that are labelled is limited depending on the available screen space. For each label, a discrete set of possible locations for the label is calculated by taking possible points on the geometry of the item being labelled, with a minimum and maximum separation, and then calculating label positions above, below, left and right of each point at a range of distances.

For each possible location, the labelling algorithm also generally calculates separate single and multi-line 'positions' and further positions where the label is hyphenated.

A 'cost' for each of these positions is calculated, involving proximity of the label to the item being labelled, conflicts of the label with other display items, degree of overlap with other items, conflict with other labels (and their leaders) etc. Priorities are assigned to display items which should be avoided (for example, a road that forms part of the route has high priority, whereas a side road has lower priority) and to items to be labelled (the next road that the user has to turn into has high priority, whereas a side road half way along a segment has low priority; large POI buildings near junctions have high priority, small ones have lower priority). No possible position is discounted at this stage, although a high cost may be associated with it if many conflicts are found.

A dummy "invisible" cost is assigned meaning that there is a certain cost associated with a label not actually being shown. This cost value is chosen so that some particularly bad positions are considered to be more costly than not being shown at all. The cost function assigns cost penalties to labels where the label interacts with the background geometry, or the road, or depending on whether it can be displayed in a single line or on several lines or whether it would be hyphenated.

The cost function also depends on the distance of the label positioned from the labelled item. Each item to be labelled has a priority—initially, only the highest priority labels are considered, for example, the top five labels, and the priorities are decided by what kind of item is to be labelled. For example, the road leading out of the schematic, in terms of the route, is given the highest priority followed by the main point of interest in the schematic followed by the road leading into the schematic.

The optimal configuration for all labels is sought by considering the solution space of all combinations of all the label positions. Given a potential solution (a configuration of all labels, each in one of their possible locations), the solution is ranked by assessing the cost of each label position, and the conflicts of the labels in that position with each other. This is a classic optimisation problem which may be solved by exhaustive searching, simulated annealing or other appropriate known methods.

For the highest priority points of interest, the cost of different label positions is calculated and the best final position is then determined by trying to optimise the combination of label positions for the high priority items. This could result in some not being labelled because, in the particular combination, the label cost exceeds the cost of not being shown at all. After that, any further items to be labelled are considered from highest to lowest priority on a "first come, first served" basis, meaning that the next item will be considered and if a label position having a cost that is smaller than the invisible cost is found, then that item is shown and labelled at that position, otherwise it is not shown.

A point of interest never appears without a label. This means that, if in the given labelling arrangement its label would not appear, then the point of interest is removed from the schematic. Conversely, points of interest at the start and finish locations are always shown.

Additional Information

Further information can be shown on the schematic to further assist the user.

At junctions, one or more arrow symbols are added to the schematic to indicate the suggested route through the junction. If the angle between the road segment taken into the junction and that taken out of the junction when following the route is less than a certain threshold, it is considered that the instruction to be provided to the user is to walk essentially straight ahead. In this case, a single arrow is shown at the centre of the junction. If the angle exceeds the threshold, representing a turning, two arrows are drawn, one showing the way into the junction, and one showing the way out.

Examples of other additional pieces of information that can be shown include graphical indications of the current position of the sun, moon or shadows (depending on the current time of day and weather conditions) to allow the user to determine his current orientation relative to the schematic displayed on the mobile device.

Some mobile devices also include compasses, which may be used to align the schematic on the screen or to provide a graphical indication of the user's current direction.

The completed routing schematic may, depending on requirements, be augmented with text descriptions, including directions expressed as text and the distance and journey time remaining.

It will be understood that the present invention has been described above purely by way of example, and modifications of detail can be made within the scope of the invention.

Each feature disclosed in the description and, (where appropriate) the claims and drawings may be provided independently or in any appropriate combination.

The invention claimed is:

1. A method of providing graphical schematic data to a mobile device, the method comprising the steps of:
   retrieving geographical data representative of a geographical network from a database, the data including a plurality of geographical features;
   receiving configuration data indicative of a property of the device;
   selecting one of a plurality of schematic types in dependence on the configuration data;
   selecting a set of geographical features from the geographical data;
   in accordance with the selected schematic type, processing the selected geographical features in accordance with a geometrical simplification algorithm and generating a graphical schematic from the processed geographical features; and
   outputting the graphical schematic to the device.

2. A method according to claim 1, wherein the plurality of schematic types comprise a first type being a representation of a single junction, and a second type being a representation of multiple junctions.

3. A method according to claim 2, wherein selecting a set of geographical features from the geographical data comprises selecting features relating to a single junction if the first type of schematic is selected, and selecting features relating to at least two junctions and a route connecting the at least two junctions if the second type of schematic is selected.

4. A method according to claim 3, wherein selecting features relating to a junction comprises selecting features which would be perceived by a pedestrian to be part of a junction in dependence on predetermined criteria.

5. A method according to claim 1, wherein the property is the screen resolution of the device.

6. A method according to claim 1, wherein the simplification algorithm aligns the features with a selected screen geometry.

7. A method according to claim 1, wherein the data includes a plurality of nodes, and the simplification algorithm adjusts the relative positions of the nodes.

8. A method according to claim 1, wherein the data includes a plurality of edges, and the simplification algorithm adjusts the relative angles between at least two such edges.

9. A method according to claim 8, wherein the simplification algorithm snaps the relative angles of at least two edges to one of a set of preferred angles.

10. A method according to claim 8, wherein the simplification algorithm adjusts the relative angles of at least two edges to be parallel or anti-parallel.

11. A method according to claim 1, wherein the simplification algorithm includes the steps of:
identifying preferable alignment relationships between different elements of the data; and
adjusting the relative positions of the elements so as to provide an arrangement which best satisfies the identified alignment relationships.

12. A method according to claim 11, the data including at least one node and at least two edges connected to the node(s) and being representative of junction exits, and wherein the simplification algorithm includes the steps of identifying at least two edges as junction exits; identifying preferable alignment relationships between the junction exits; and adjusting the relative positions and/or angles of the junction exits so as to provide an arrangement which best satisfies the identified alignment relationships.

13. A method according to claim 11, further comprising computing a measure of the strength of the alignment relationships in dependence on the similarity of the geometry of the elements to a predetermined relationship, such as a parallel or anti-parallel relationship.

14. A method according to claim 1, the data including nodes and edges connected to the nodes, and wherein the simplification algorithm preserves anti-parallel relationships between pairs of edges in preference to parallel relationships between pairs of edges.

15. A method according to claim 1, the data including nodes and edges connected to the nodes, and wherein the simplification algorithm includes the steps of identifying one or more of said edges as junction exits; and grouping the junction exits into clumps of junction exits which can be displayed as emanating from the same point.

16. A method according to claim 15, wherein the simplification algorithm attempts to minimise the number of clumps.

17. A method according to claim 1, the data including nodes and edges connected to the nodes, and wherein the simplification algorithm includes the steps of:
identifying one or more of said edges as junction exits;
determining the angle of each of the junction exit(s); and
modifying the data in accordance with the angle(s) of the junction exit(s).

18. A method according to claim 17, wherein the junction exit is defined by a series of polyline segments at different angles, and the angle of the junction exit is determined by analysing the polyline segments to determine a representative angle.

19. A method according to claim 1, further comprising the steps of: receiving route data defining a route as a set of nodes; computing a measure of the significance of one such node; and processing the route data in accordance with the computed significance.

20. A method according to claim 19, wherein computing a measure of the significance of a node comprises classifying the node as one of significant and insignificant.

21. A method according to claim 19, wherein computing a measure of the significance of a node comprises retrieving a first parameter associated with a first edge connected to the node and a second parameter associated with a second edge connected to the node; and comparing the first and second parameters.

22. A method according to claim 21, wherein the first parameter comprises a classification associated with the first edge and the second parameter comprises a classification associated with the second edge.

23. A method according to claim 21, wherein the first parameter comprises a road name associated with the first edge and the second parameter comprises a road name associated with the second edge.

24. A method according to claim 19, further comprising segmenting the route into a plurality of route segments in accordance with said computed significance.

25. A method according to claim 19, comprising computing a measure of the significance of each of a plurality of such nodes.

26. A method according to claim 25, comprising segmenting the route into a plurality of route segments in accordance with said computed significances.

27. A method according to claim 26, wherein segmenting the route comprises generating a route segment bounded by two significant nodes.

28. A method according to claim 26, the route having a start node and an end node, and wherein segmenting the route comprises generating a plurality of route segments each bounded by two significant nodes or by one significant node and one of the start and end nodes.

29. A method according to claim 26, further comprising further segmenting one of the plurality of route segments if the segment exceeds a pre-determined length or if the segment comprises more than a pre-determined number of insignificant nodes.

30. A method according to claim 26, comprising generating a graphical schematic for at least one of the plurality of route segments, preferably for each of the plurality of route segments.

31. A method according to claim 1, wherein the graphical schematic generated is one of: a location schematic for providing information about a location, an orientation schematic for enabling a user to determine their location, and a routing schematic for indicating a route.

32. A method according to claim 1, further comprising:
selecting one or more of points of interest from a database in accordance with a predetermined selection algorithm; and
generating a graphical schematic including the selected points of interest.

33. A method according to claim 32, wherein the selection algorithm includes the steps of:
ranking a plurality of points of interest; and
selecting one or more of the points of interest in accordance with their rank.

34. A method according to claim 32, wherein the selection algorithm includes the steps of:
retrieving one or more stored parameters associated with each point of interest; and
selecting one or more of the points of interest in accordance with their associated stored parameter(s).

35. A method according to claim 32, wherein the selection algorithm comprises the steps of:
selecting a location; and
selecting one or more points of interest within a predetermined radius of the selected location.

36. A method according to claim 32, wherein the database includes a plurality of nodes and the selection algorithm includes the step of:
- selecting a node;
- defining a region surrounding the node; and
- selecting points of interest within the defined region.

37. A method according to claim 36, wherein the step of defining a region surrounding the node comprises defining a circular region centered on the node.

38. A method according to claim 32, wherein the selection algorithm selects one or more of points of interest from the database in accordance with at least one of: the visibility of the points of interest; and the time of day.

39. A method according to claim 32, further comprising storing a list of favorite points of interest associated with a particular user, wherein the selection algorithm preferentially selects points of interest stored in the list.

40. A method according to claim 1, wherein the graphical schematic relates to a location bounded by a defined geographical area, the method comprising the steps of:
- selecting one or more of points of interest falling outside the defined geographical area from the database; and
- generating a graphical schematic of the defined geographical area, the graphical schematic including an indication of the direction of the point(s) of interest falling outside the defined geographical area.

41. A method according to claim 40, wherein the graphical schematic also includes an indication of the distance to the point(s) of interest falling outside the defined geographical area.

42. A method according to claim 1, further comprising: determining the current position of the moon or sun; and including in the generated graphical schematic information which indicates the determined position, preferably in the form of a marker.

43. A method according to claim 42, wherein the position of the marker within the schematic is dependent on the current position of the moon or sun.

44. A method according to claim 42, wherein the marker comprises a shadow image, the configuration of the shadow image being dependent on the current position of the moon or sun.

45. A method according to claim 1, wherein the graphical schematic is generated by, processed by and/or output from a central server; the method including receiving and displaying the graphical schematic at a mobile client device.

46. A computer program product for providing graphical schematic data to a mobile device, comprising a computer usable medium storing a computer program which, when executed, causes a processor to perform a method as claimed in claim 1.

47. Apparatus for providing graphical schematic darn to a mobile device, comprising:
- means for retrieving geographical data representative of a geographical network from a database, the data including a plurality of geographical features;
- means for receiving configuration data indicative of a property of the device;
- means for selecting one of a plurality of schematic types in dependence on the configuration data;
- means for selecting a set of geographical features from the geographical data;
- means for, in accordance with the selected schematic type, processing the selected geographical features in accordance with a geometrical simplification algorithm and generating a graphical schematic from the processed geographical features; and
- means for outputting the graphical schematic to the device.

48. Apparatus for providing graphical schematic data to a mobile device, comprising a processor and associated memory arranged to:
- retrieve geographical data representative of a geographical network from a database, the data including a plurality of geographical features;
- receive configuration data indicative of a property of the device;
- select one of a plurality of schematic types in dependence on the configuration data;
- select a set of geographical features from the geographical data;
- in accordance with the selected schematic type, process the selected geographical features in accordance with a geometrical simplification algorithm and generate a graphical schematic from the processed geographical features; and
- output the graphical schematic to the device.

* * * * *

UNITED STATES PATENT AND TRADEMARK OFFICE
CERTIFICATE OF CORRECTION

PATENT NO. : 7,440,875 B2  Page 1 of 1
APPLICATION NO. : 10/502276
DATED : October 21, 2008
INVENTOR(S) : Adrian Cuthbert It is certified that error appears in the above-identified patent and that said Letters Patent is hereby corrected as shown below:

Claim 47 should read
Claim 47: Apparatus for providing graphical schematic ~~darn~~ data to a mobile device, comprising:
  means for retrieving geographical data representative of a geographical network from a database, the data including a plurality of geographical features;
  means for receiving configuration data indicative of a property of the device;
  means for selecting one of a plurality of schematic types in dependence on the configuration data;
  means for selecting a set of geographical features from the geographical data;
  means for, in accordance with the selected schematic type, processing the selected geographical features in accordance with a geometrical simplification algorithm and generating a graphical schematic from the processed geographical features; and
  means for outputting the graphical schematic to the device.

Signed and Sealed this

Third Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,440,875 B2
APPLICATION NO. : 10/502276
DATED : October 21, 2008
INVENTOR(S) : Adrian Cuthbert It is certified that error appears in the above-identified patent and that said Letters Patent is hereby corrected as shown below:

Column 54, Claim 47, lines 8-24, should read
Claim 47: Apparatus for providing graphical schematic ~~darn~~ data to a mobile device, comprising:
    means for retrieving geographical data representative of a geographical network from a database, the data including a plurality of geographical features;
    means for receiving configuration data indicative of a property of the device;
    means for selecting one of a plurality of schematic types in dependence on the configuration data;
    means for selecting a set of geographical features from the geographical data;
    means for, in accordance with the selected schematic type, processing the selected geographical features in accordance with a geometrical simplification algorithm and generating a graphical schematic from the processed geographical features; and
    means for outputting the graphical schematic to the device.

This certificate supersedes the Certificate of Correction issued February 3, 2009.

Signed and Sealed this

Twenty-fourth Day of February, 2009

JOHN DOLL
*Acting Director of the United States Patent and Trademark Office*